(12) United States Patent
Nakamura et al.

(10) Patent No.: US 7,956,971 B2
(45) Date of Patent: *Jun. 7, 2011

(54) LIQUID CRYSTAL DISPLAY AND ELECTRONIC DEVICE HAVING SAME

(75) Inventors: Hisakazu Nakamura, Yamatokoriyama (JP); Masumi Kubo, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 150 days.

This patent is subject to a terminal disclaimer.

(21) Appl. No.: 11/596,595

(22) PCT Filed: May 17, 2005

(86) PCT No.: PCT/JP2005/008975

§ 371 (c)(1),
(2), (4) Date: Nov. 15, 2006

(87) PCT Pub. No.: WO2005/111708

PCT Pub. Date: Nov. 24, 2005

(65) Prior Publication Data

US 2007/0199504 A1  Aug. 30, 2007

(30) Foreign Application Priority Data

May 18, 2004 (JP) ................................. 2004-148273

(51) Int. Cl.
*G02F 1/1343* (2006.01)
(52) U.S. Cl. .................. 349/139; 349/144; 349/114
(58) Field of Classification Search .............. 349/139, 349/143, 144, 146, 113, 114
See application file for complete search history.

(56) References Cited

U.S. PATENT DOCUMENTS

| 6,384,889 | B1 | 5/2002 | Miyachi et al. | |
|---|---|---|---|---|
| 6,710,825 | B2 | 3/2004 | Kubo et al. | |
| 6,788,375 | B2 | 9/2004 | Ogishima et al. | |
| 6,862,062 | B2 | 3/2005 | Kubo et al. | |
| 6,924,876 | B2 | 8/2005 | Kubo et al. | |
| 6,950,160 | B2 | 9/2005 | Kubo et al. | |
| 6,965,422 | B2 | 11/2005 | Kubo et al. | |
| 7,139,052 | B2 * | 11/2006 | Maeda | 349/114 |
| 7,375,781 | B2 * | 5/2008 | Kubo | 349/114 |

(Continued)

OTHER PUBLICATIONS

International Preliminary Report on Patentability dated Nov. 21, 2006 for PCT/JP2005/008975.

(Continued)

*Primary Examiner* — Sarah Hahm
(74) *Attorney, Agent, or Firm* — Nixon & Vanderhye, P.C.

(57) ABSTRACT

There is provided a CPA-type liquid crystal display device in which deterioration in display quality due to application of stress to a liquid crystal panel is suppressed.

A liquid crystal display device according to the present invention includes a first substrate; a second substrate; and a liquid crystal layer of a vertical-alignment type provided therebetween. In each picture element region, a first electrode provided on a side of the first substrate facing the liquid crystal layer includes a solid portion formed of an electrically-conductive film and a non-solid portion in which no electrically-conductive film is formed. The solid portion includes a plurality of unit solid portions each of which is substantially surrounded by the non-solid portion, the plurality of unit solid portions being arranged at least along a first direction. When a voltage is applied, with an oblique electric field generated at an edge of the non-solid portion, the liquid crystal layer within the picture element region forms a liquid crystal domain on each unit solid portion, the liquid crystal domain taking a radially-inclined orientation. The length of the unit solid portion along the first direction is 70 μm or less.

13 Claims, 16 Drawing Sheets

U.S. PATENT DOCUMENTS

| | | |
|---|---|---|
| 7,379,137 B2 * | 5/2008 | Kubo .......................... 349/114 |
| 2002/0036740 A1 | 3/2002 | Kubo et al. |
| 2002/0075436 A1 | 6/2002 | Kubo et al. |
| 2002/0080320 A1 | 6/2002 | Suzuki et al. |
| 2004/0032552 A1 | 2/2004 | Kim |
| 2004/0041770 A1 | 3/2004 | Kubo et al. |
| 2004/0061817 A1 | 4/2004 | Maeda |
| 2004/0070714 A1 | 4/2004 | Ishii et al. |
| 2004/0075793 A1 | 4/2004 | Itoh et al. |
| 2004/0201810 A1 | 10/2004 | Kubo et al. |
| 2005/0001947 A1 | 1/2005 | Ogishima et al. |
| 2005/0168674 A1 | 8/2005 | Kubo |
| 2005/0174528 A1 | 8/2005 | Kubo et al. |
| 2005/0237463 A1 | 10/2005 | Kubo |
| 2006/0119776 A1 | 6/2006 | Kubo et al. |
| 2006/0158574 A1 | 7/2006 | Kubo et al. |

OTHER PUBLICATIONS

International Search Report for PCT/JP2005/008975 dated Jun. 21, 2005.

U.S. Appl. No. 11/018,767, filed Dec. 22, 2004, Inventor: Kubo.

* cited by examiner

FIG.1
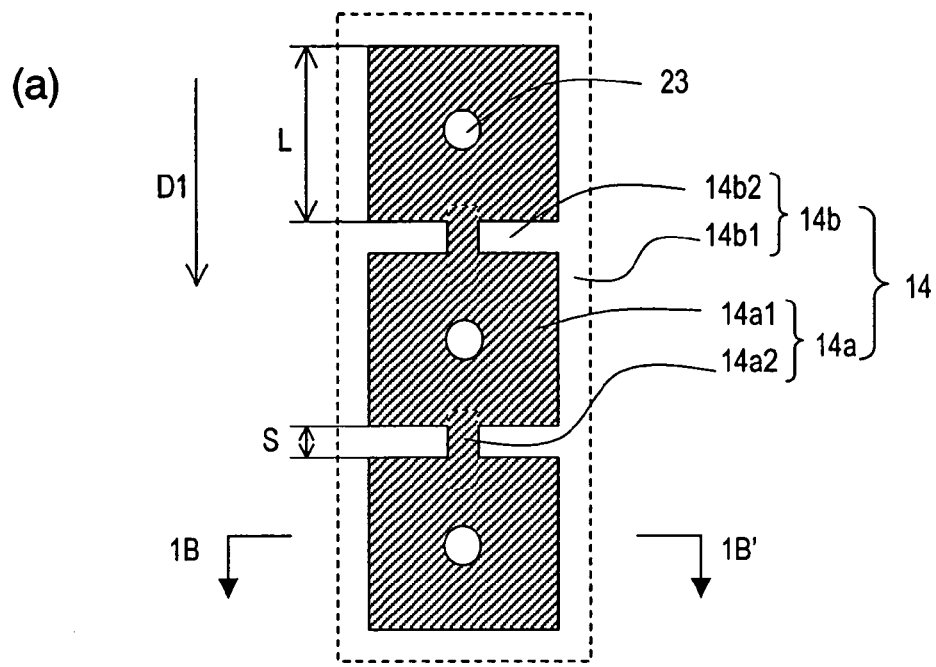
(a)
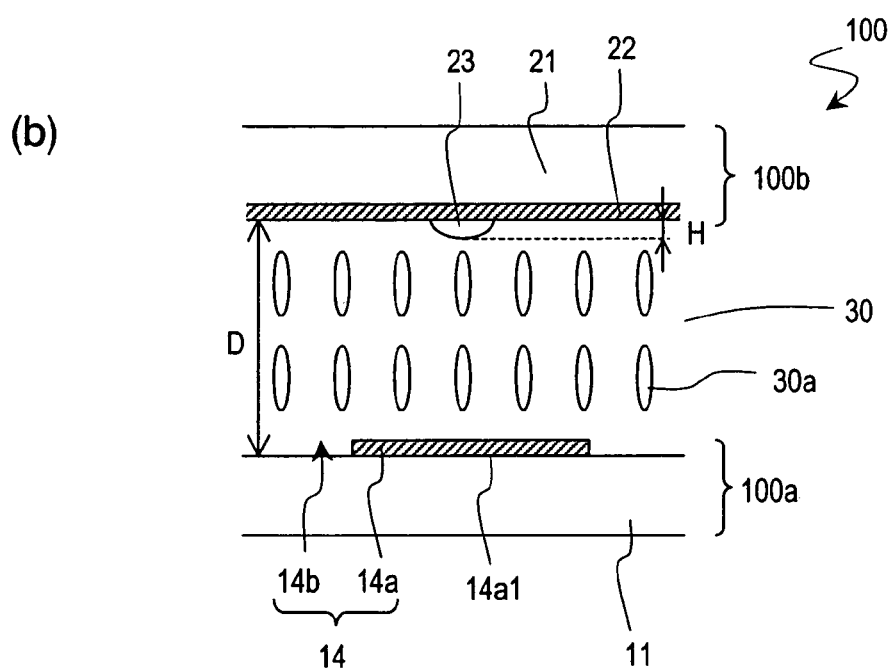
(b)

FIG.2
(a)
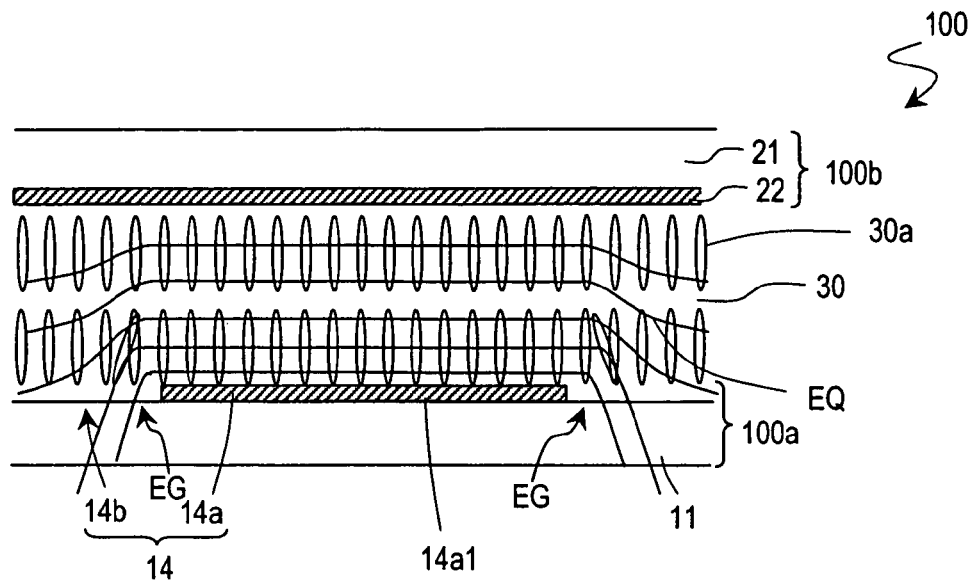
(b)
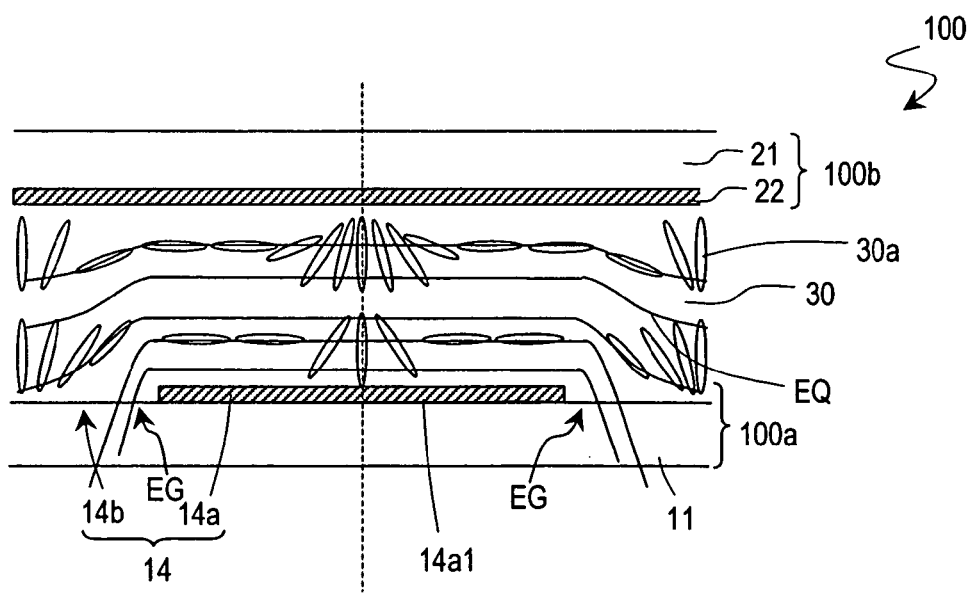

FIG.3
(a)
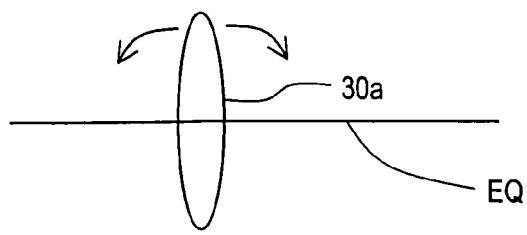
(b)
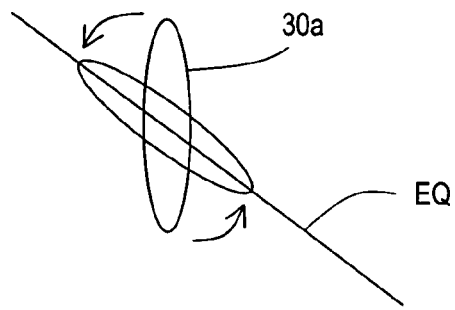
(c)
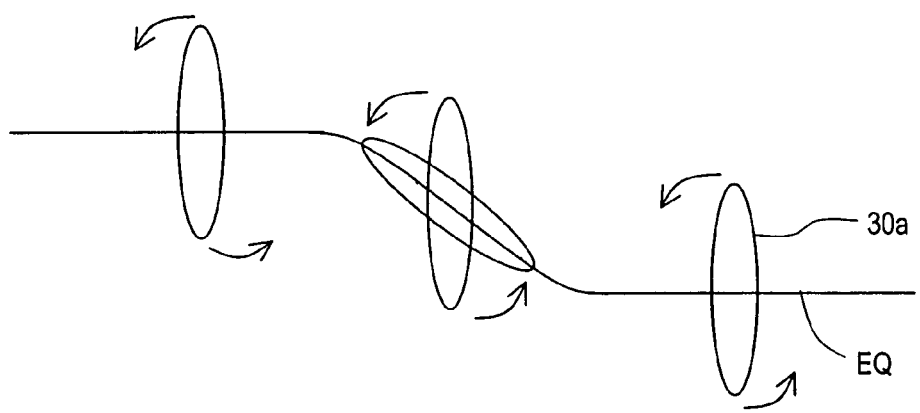
(d)
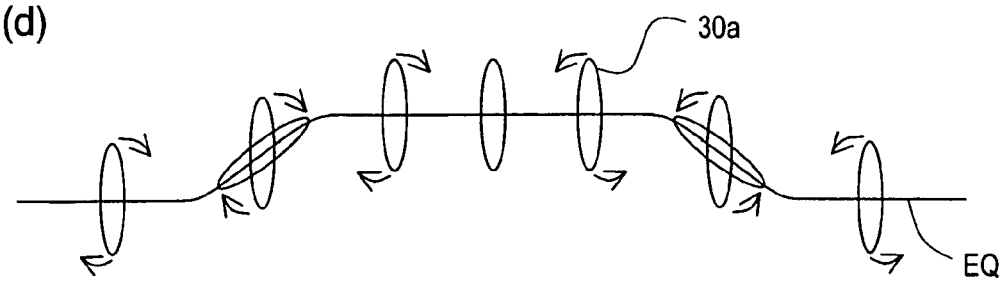

FIG.4
(a)
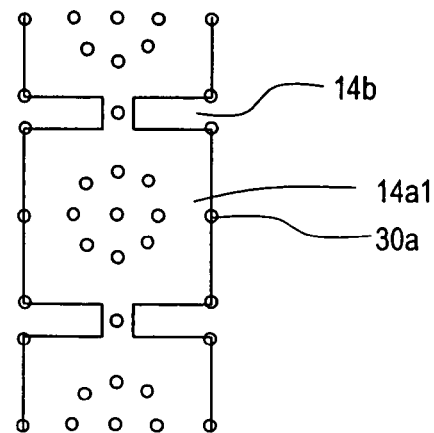
(b)
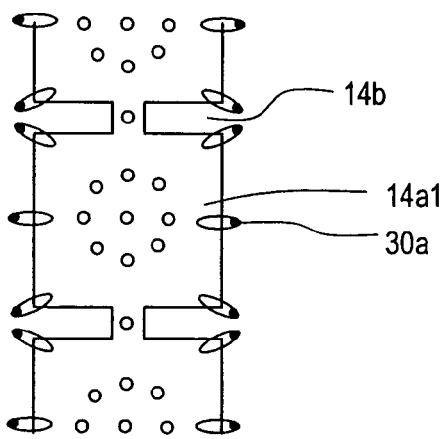
(c)
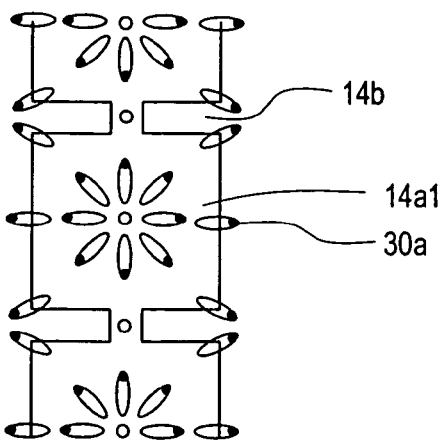

FIG.5
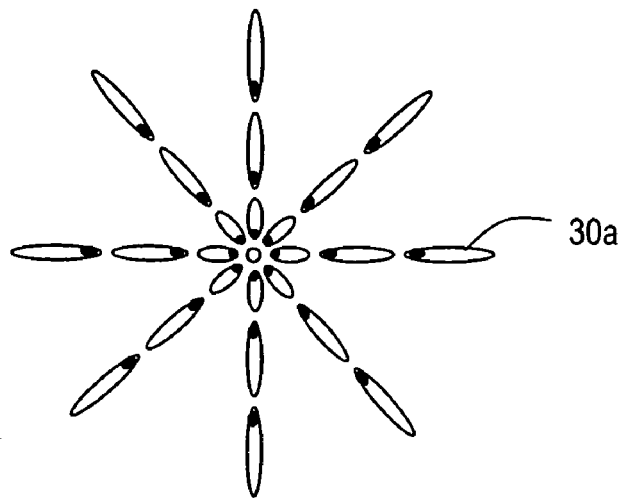
(a)
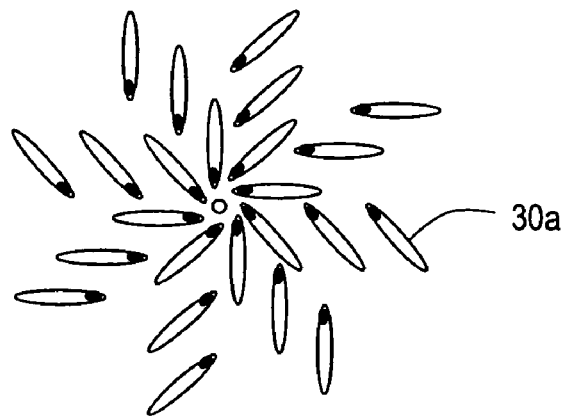
(b)
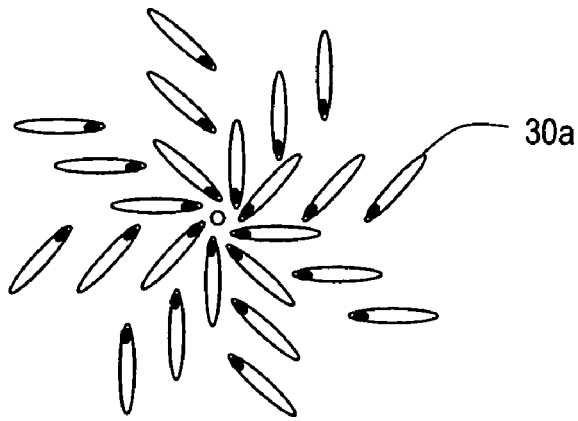
(c)

FIG.6
(a)
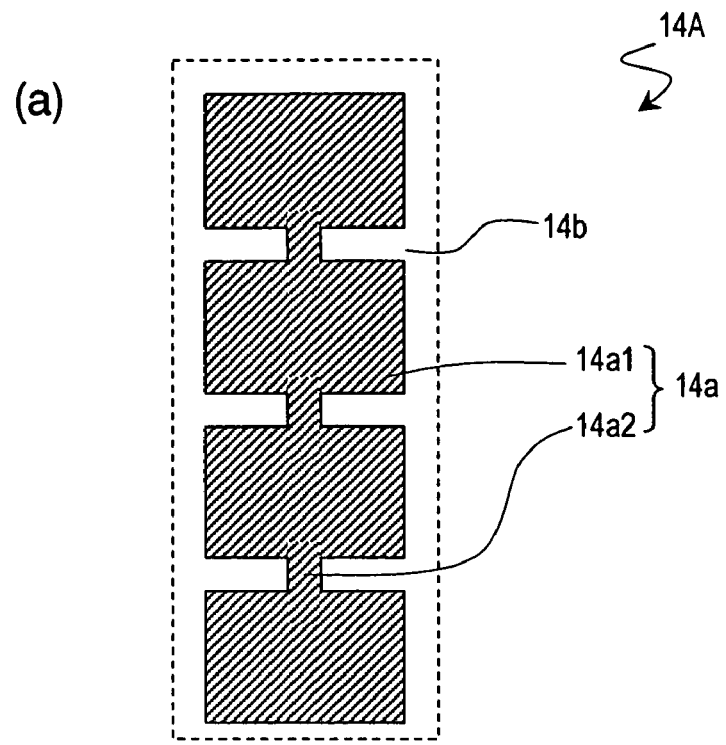
(b)
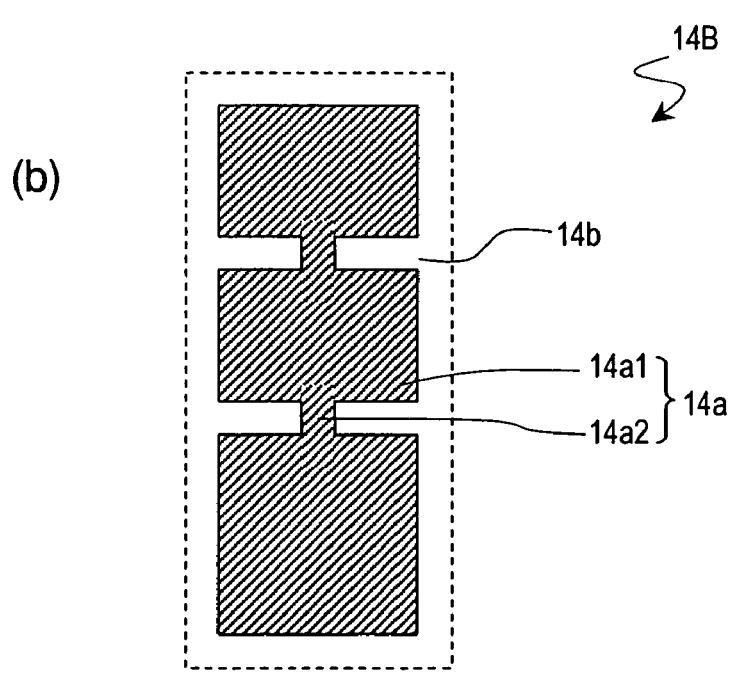

FIG.9
(a)
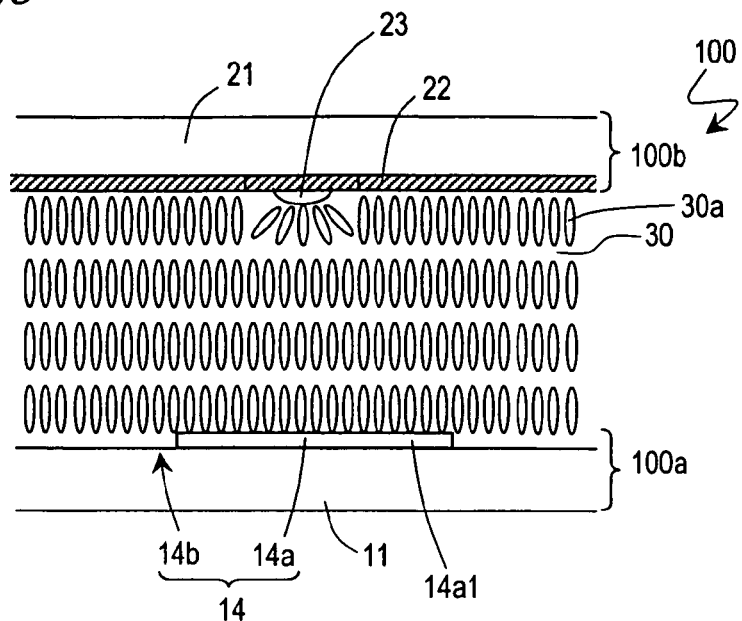
(b)
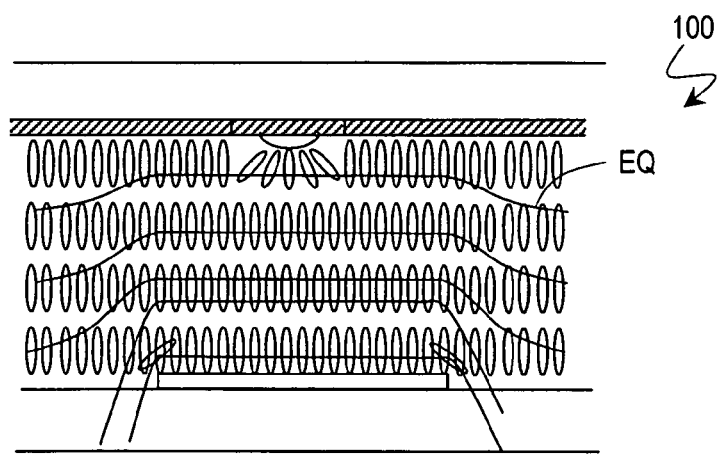
(c)
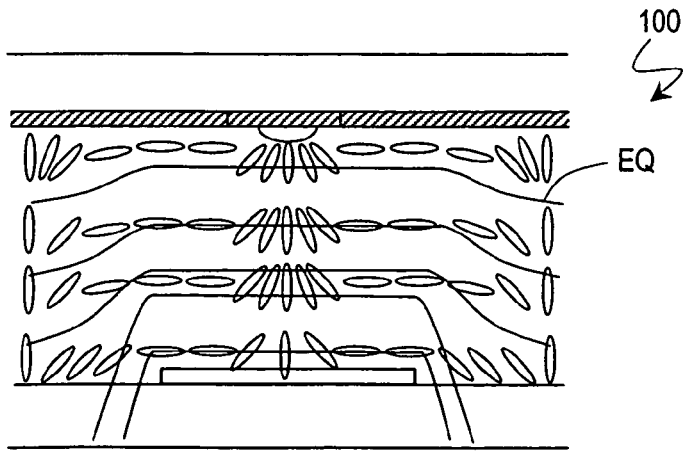

FIG.10
(a) Before Stress Application
(b) After Stress Application
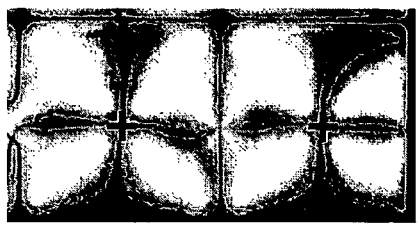
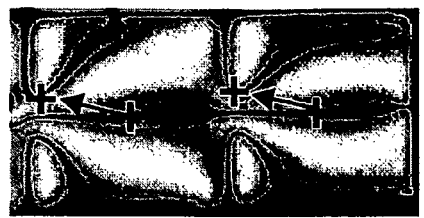
FIG.11
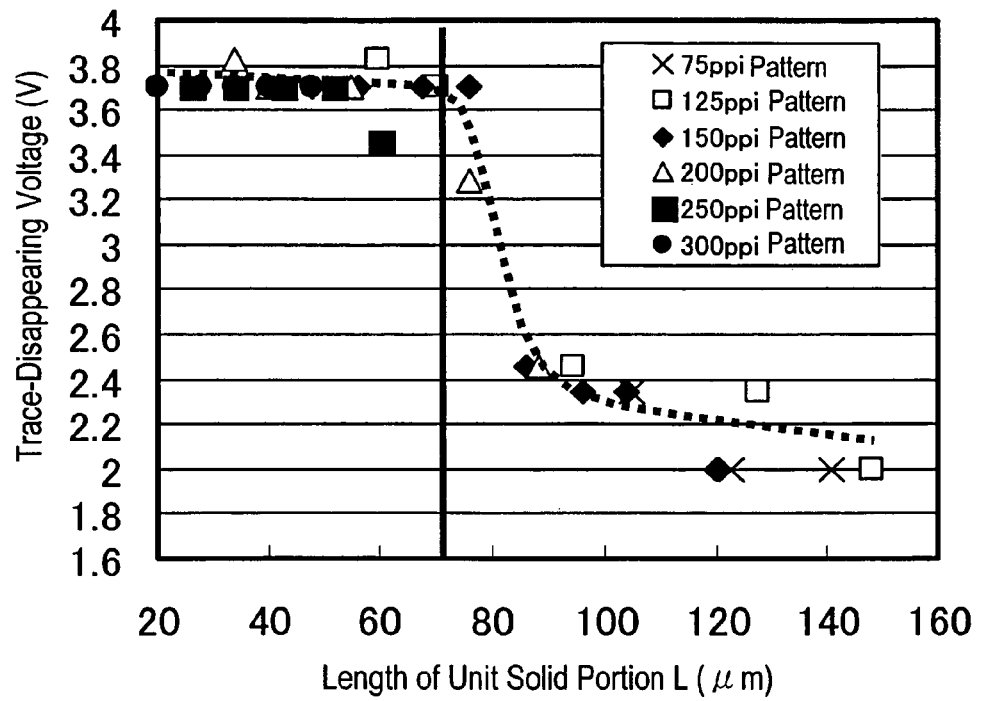
Length of Unit Solid Portion L (μm)
FIG.12
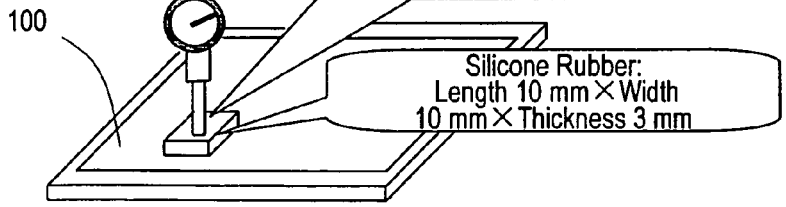
Press at 500 gf for 2 Seconds
OK if Trace disappears within 30 Seconds after Stress is Removed
Silicone Rubber: Length 10 mm × Width 10 mm × Thickness 3 mm FIG.16
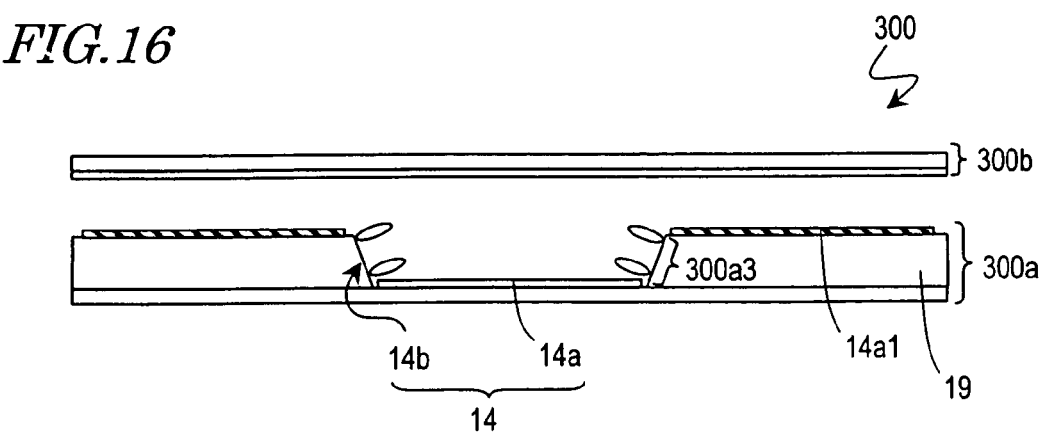
FIG.17
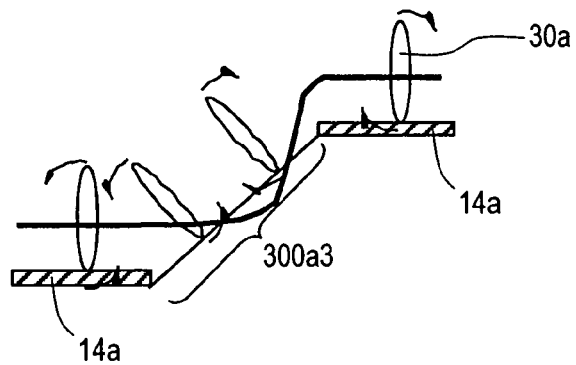
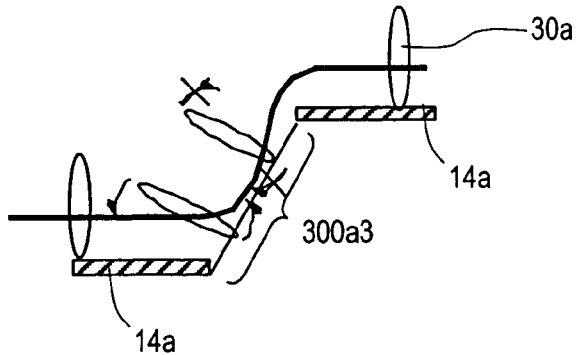
FIG.18
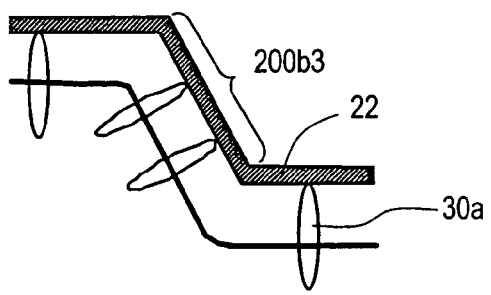

FIG.20
(a) 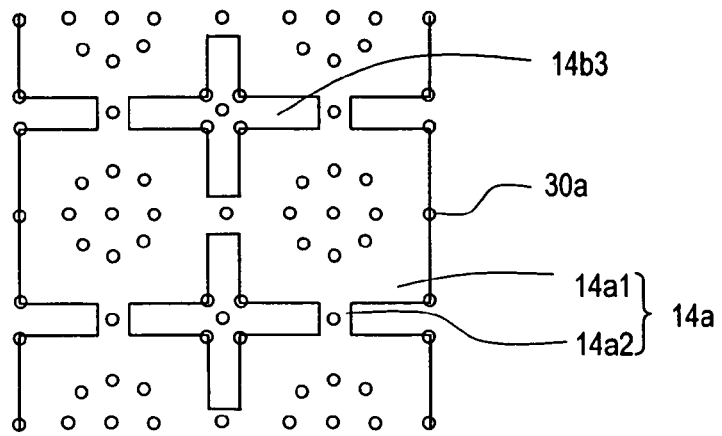
(b) 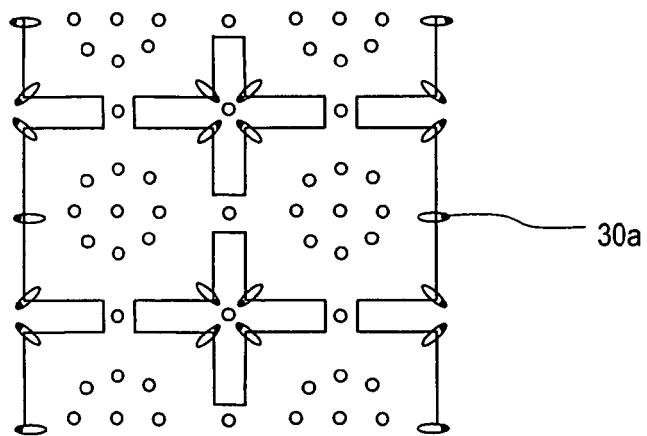
(c) 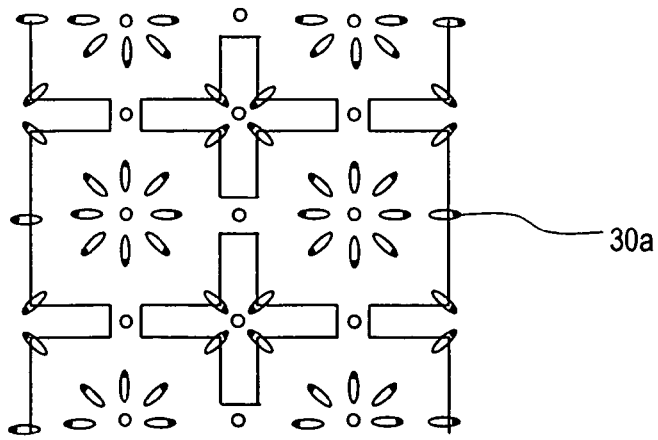

LIQUID CRYSTAL DISPLAY AND ELECTRONIC DEVICE HAVING SAME

This application is the US national phase of international application PCT/JP2005/008975 filed 17 May 2005, which designated the U.S. and claims priority to JP 2004-148273 filed 18 May 2004, the entire content of each of which is hereby incorporated by reference.

TECHNICAL FIELD

The present technology relates to a liquid crystal display device, and more particularly to a liquid crystal display device which has wide viewing angle characteristics and performs display with a high quality. The present technology also relates to an electronic apparatus incorporating such a liquid crystal display device.

BACKGROUND ART

In recent years, thin and light-weight liquid crystal display devices have been utilized as display devices for use in the displays of personal computers and the display sections of mobile information terminal devices. However, conventional twisted nematic type (TN type) and super twisted nematic type (STN type) liquid crystal display devices have the disadvantage of narrow viewing angles. Various technological developments have been made in order to overcome these disadvantages.

As a technique for improving viewing angle characteristics, the CPA (Continuous Pinwheel Alignment) method has been proposed (see Patent Document 1, for example). In the CPA method, an opening and/or a recess portion is provided in one of a pair of electrodes which oppose each other via a vertical-alignment type liquid crystal layer, and liquid crystal molecules are placed in a radially-inclined orientation by utilizing an oblique electric field which is generated at an edge of such an opening or recess portion, thus realizing a high quality display with a wide viewing angle.

[Patent Document 1] Japanese Laid-Open Patent Publication No. 2003-43525

DISCLOSURE OF TECHNOLOGY

Problems to be Solved by the Technology

Although the aforementioned CPA method realizes a stable orientation state, if a large stress is applied to the liquid crystal panel, the radially-inclined orientation in the liquid crystal layer may be disturbed. If a long time is required for returning to a normal orientation state from the disturbed orientation state, there is a problem in that the viewer may perceive a degradation in display quality. The inventor has performed various studies concerning the aforementioned problem, and found that the length of time required for returning to a normal orientation state from a disturbed orientation state is strongly correlated to the electrode structures in the CPA method.

The present technology has been made in view of the above problem, and an objective thereof is to provide a CPA-type liquid crystal display device in which degradation in the display quality due to application of stress to the liquid crystal panel is suppressed, and an electronic apparatus incorporating the same.

Means for Solving the Problems

A liquid crystal display device according to a first aspect comprises: a first substrate; a second substrate; a liquid crystal layer of a vertical-alignment type provided between the first substrate and the second substrate; and a picture element region defined by a first electrode provided on a side of the first substrate facing the liquid crystal layer and a second electrode provided on the second substrate and opposing the first electrode via the liquid crystal layer, wherein, the picture element region includes a transmission region in which transmission-mode display is performed by using light entering through the first substrate; in the picture element region, the first electrode includes a solid portion formed of an electrically-conductive film and a non-solid portion in which no electrically-conductive film is formed, the solid portion including a plurality of unit solid portions each of which is substantially surrounded by the non-solid portion, the plurality of unit solid portions being arranged at least along a first direction; when a voltage is applied between the first electrode and the second electrode, with an oblique electric field generated at an edge of the non-solid portion, the liquid crystal layer forms a liquid crystal domain on each of the plurality of unit solid portions, the liquid crystal domain taking a radially-inclined orientation; and the plurality of unit solid portions include at least one unit solid portion located in the transmission region, and a length of the unit solid portion located in the transmission region, along the first direction, is 70 μm or less. Thus, the aforementioned objective is met.

In a preferred embodiment, an interval of the plurality of unit solid portions along the first direction is 8.0 μm or more.

A liquid crystal display device according to a second aspect comprises: a first substrate; a second substrate; a liquid crystal layer of a vertical-alignment type provided between the first substrate and the second substrate; and a picture element region defined by a first electrode provided on a side of the first substrate facing the liquid crystal layer and a second electrode provided on the second substrate and opposing the first electrode via the liquid crystal layer, wherein, the picture element region includes a transmission region in which transmission-mode display is performed by using light entering through the first substrate; in the picture element region, the first electrode includes a solid portion formed of an electrically-conductive film and a non-solid portion in which no electrically-conductive film is formed, the solid portion including a plurality of unit solid portions each of which is substantially surrounded by the non-solid portion; when a voltage is applied between the first electrode and the second electrode, with an oblique electric field generated at an edge of the non-solid portion, the liquid crystal layer forms a liquid crystal domain on each of the plurality of unit solid portions, the liquid crystal domain taking a radially-inclined orientation; and the plurality of unit solid portions are arranged at least along a first direction, and an interval of the plurality of unit solid portions along the first direction is 8.0 μm or more. Thus, the aforementioned objective is met.

In a preferred embodiment, the interval of the plurality of unit solid portions along the first direction is 8.5 μm or more.

In a preferred embodiment, the second substrate includes a protrusion provided in a region corresponding to a vicinity of a center of the liquid crystal domain formed in the transmission region, and a ratio H/D of a height H of the protrusion to a thickness D of the liquid crystal layer is 0.42 or more.

A liquid crystal display device according to a third aspect comprises: a first substrate; a second substrate; a liquid crystal layer of a vertical-alignment type provided between the first substrate and the second substrate; and a picture element region defined by a first electrode provided on a side of the first substrate facing the liquid crystal layer and a second electrode provided on the second substrate and opposing the first electrode via the liquid crystal layer, wherein, the picture element region includes a transmission region in which transmission-mode display is performed by using light entering through the first substrate; in the picture element region, the first electrode includes a solid portion formed of an electrically-conductive film and a non-solid portion in which no electrically-conductive film is formed, the solid portion including a plurality of unit solid portions each of which is substantially surrounded by the non-solid portion, the plurality of unit solid portions being arranged at least along a first direction; when a voltage is applied between the first electrode and the second electrode, with an oblique electric field generated at an edge of the non-solid portion, the liquid crystal layer forms a liquid crystal domain on each of the plurality of unit solid portions, the liquid crystal domain taking a radially-inclined orientation; and the second substrate includes a protrusion provided in a region corresponding to a vicinity of a center of the liquid crystal domain formed in the transmission region, and a ratio H/D of a height H of the protrusion to a thickness D of the liquid crystal layer is 0.42 or more. Thus, the aforementioned objective is met.

In a preferred embodiment, the ratio H/D of a height H of the protrusion to a thickness D of the liquid crystal layer is 0.47 or more.

In a preferred embodiment, the ratio H/D of a height H of the protrusion to a thickness D of the liquid crystal layer is 0.53 or more.

In a preferred embodiment, the solid portion of the first electrode includes at least one connecting portion connecting between two adjoining unit solid portions among the plurality of unit solid portions.

In a preferred embodiment, the at least one connecting portion includes a connecting portion connecting between, among the plurality of unit solid portions, those unit solid portions which adjoin each other along the first direction.

In a preferred embodiment, the picture element region further includes a reflection region in which reflection-mode display is performed by using light entering through the second substrate.

In a preferred embodiment, the orientation of the liquid crystal domain and an orientation of a region of the liquid crystal layer corresponding to the non-solid portion are continuous with each other.

In a preferred embodiment, each of the plurality of unit solid portions is of a shape having rotational symmetry.

In a preferred embodiment, each of the plurality of unit solid portions is of a generally rectangular shape.

In a preferred embodiment, each of the plurality of unit solid portions is of a generally rectangular shape having generally arc-shaped corners.

In a preferred embodiment, the plurality of unit solid portions are arranged also along a second direction intersecting the first direction.

In a preferred embodiment, the non-solid portion has at least one opening which is substantially surrounded by the solid portion, and when a voltage is applied between the first electrode and the second electrode, the liquid crystal layer forms a liquid crystal domain also in a region of the liquid crystal layer corresponding to the opening, the liquid crystal domain taking a radially-inclined orientation.

An electronic apparatus may include a liquid crystal display device of the aforementioned construction. Thus, the aforementioned objective is met.

In a preferred embodiment, the electronic apparatus is a mobile electronic apparatus.

In a preferred embodiment, the electronic apparatus does not comprise a protective plate on a viewer's side of the second substrate.

EFFECTS OF THE TECHNOLOGY

In a liquid crystal display device, one (first electrode) of a pair of electrodes opposing each other via a vertical-alignment type liquid crystal layer includes a solid portion formed of an electrically-conductive film, and a non-solid portion in which no electrically-conductive film is formed. The solid portion of the first electrode includes a plurality of unit solid portions each of which is substantially surrounded by the non-solid portion, and which are arranged at least along a certain direction (first direction). Under an applied voltage, with an oblique electric field generated at an edge of the non-solid portion, the liquid crystal layer forms a liquid crystal domain on each unit solid portion, the liquid crystal domain taking a radially-inclined orientation.

According to a first aspect, the length of the unit solid portion is prescribed to be within a predetermined range. As a result, there is provided a CPA-type liquid crystal display device in which deterioration in display quality due to application of stress to a liquid crystal panel is suppressed.

According to a second aspect, the interval of unit solid portions is prescribed to be within a predetermined range. As a result, there is provided a CPA-type liquid crystal display device in which deterioration in display quality due to application of stress to a liquid crystal panel is suppressed.

According to a third aspect, the height of a protrusion of the second substrate opposing the first substrate on which the first electrode is provided is prescribed to be within a predetermined range. As a result, there is provided a CPA-type liquid crystal display device in which deterioration in display quality due to application of stress to a liquid crystal panel is suppressed.

BRIEF DESCRIPTION OF DRAWINGS

FIGS. 1a and 1b are diagrams schematically showing the structure of a liquid crystal display device 100, where FIG. 1(a) is an upper plan view; and FIG. 1(b) is a cross-sectional view taken along line 1B-1B' in FIG. 1(a).

FIGS. 2(a) and (b) are diagrams each showing a state in which a voltage is applied across a liquid crystal layer 30 of the liquid crystal display device 100, where FIG. 2(a) schematically shows a state where the orientation has begun to change (ON initial state); and FIG. 2(b) schematically shows a stationary state.

FIGS. 3(a) to (d) are diagrams schematically showing a relationship between an electric line of force and orientation of a liquid crystal molecule.

FIGS. 4(a) to (c) are diagrams schematically showing orientation states of liquid crystal molecules in the liquid crystal display device 100, as seen from a substrate normal direction.

FIGS. 5(a) to (c) are diagrams schematically showing examples of radially-inclined orientation of liquid crystal molecules.

FIGS. 6(a) and (b) are upper plan views schematically showing other picture element electrodes to be used in the liquid crystal display device.

FIGS. 9(a) to (c) are diagrams schematically showing a manner in which orientation in the liquid crystal layer 30 of the liquid crystal display device 100 changes, where FIG. 9(a) shows absence of an applied voltage; FIG. 9(b) shows a state where the orientation has begun to change (ON initial state); and FIG. 9(c) shows a stationary state.

FIG. 10(a) is a micrograph showing a state of a liquid crystal domain before stress is applied to a liquid crystal panel; and FIG. 10(b) is a micrograph showing a state of the liquid crystal domain after stress is applied to the liquid crystal panel.

FIG. 11 is a graph showing results of measuring a trace-disappearing voltage while varying the length L of each unit solid portion 14a1.

FIG. 12 is a diagram schematically showing how a pressure test is carried out.

FIG. 15(a) is an upper plan view.

FIG. 16 is a cross-sectional view schematically showing a liquid crystal display device 300 of a multi-gap structure, where a level difference is introduced in a TFT substrate 300a.

FIGS. 17(a) and (b) are diagrams schematically showing a relationship between an electric line of force and orientation of liquid crystal molecules on a side face of level difference of the liquid crystal display device 300.

FIG. 18 is a diagram schematically showing a relationship between an electric line of force and orientation of liquid crystal molecules on a side face of level difference of the liquid crystal display device 200.

FIGS. 20(a) to (c) are diagrams schematically showing orientation states of liquid crystal molecules as seen from a substrate normal direction in the case where the picture element electrode shown in FIG. 19 is used.

Figure 7:
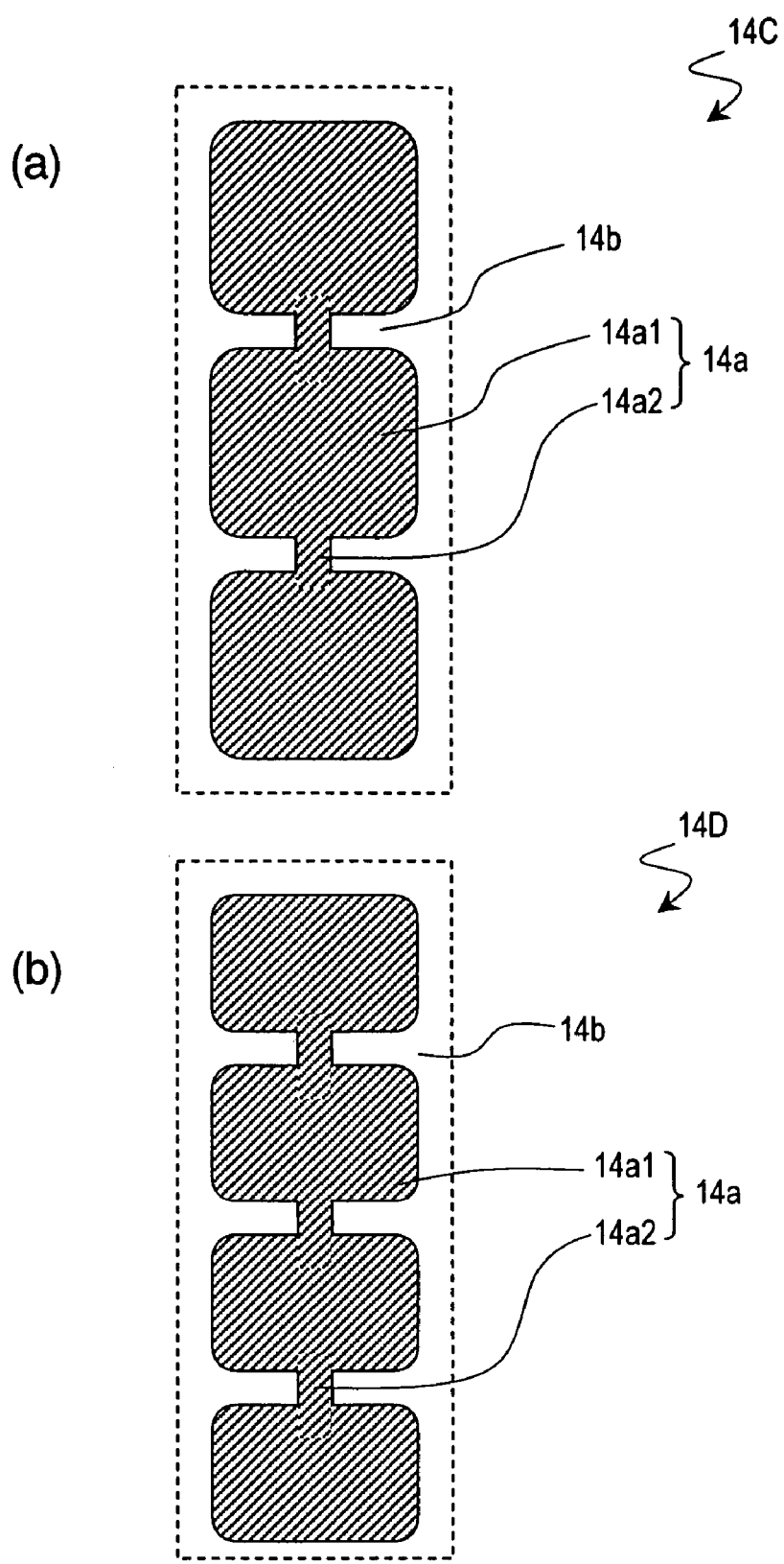
FIGS. 7(a) and (b) are upper plan views schematically showing still other picture element electrodes to be used in the liquid crystal display device.

DESCRIPTION OF THE REFERENCE NUMERALS 11, 21 transparent substrate
14 picture element electrode
14a solid portion
14a1 unit solid portion
14a2 connecting portion
14b non-solid portion
14b1 frame portion
14b2 recess portion
14b3 opening
22 counter electrode
23 protrusion
29 transparent dielectric layer
30 liquid crystal layer
30a liquid crystal molecule
100 liquid crystal display device
100a TFT substrate
100b counter substrate

DETAILED DESCRIPTION OF PREFERRED EMBODIMENTS

Hereinafter, embodiments of the present technology will be described with reference to the drawings. A liquid crystal display device embodying the technology has excellent display characteristics and therefore is suitably used in an active-matrix liquid crystal display device. Hereinafter, embodiments of the present technology will be described with respect to an active-matrix liquid crystal display device employing thin film transistors (TFTs). Without being limited thereto, the present technology is also applicable to an active-matrix liquid crystal display device employing MIMs.

In the present specification, each region of a liquid crystal display device corresponding to a "picture element", which defines a minimal unit of display, will be referred to as a "picture element region". In a color liquid crystal display device, a plurality of "picture elements" including R, G and B "picture elements" correspond to one "pixel". In an active-matrix liquid crystal display device, picture element electrodes and a counter electrode opposing the picture element electrodes define picture element regions. In a passive-matrix liquid crystal display device, each of the regions where column electrodes (which are provided in stripes) and row electrodes (which are provided so as to be orthogonal to the column electrodes) intersect defines a picture element region. In a construction where a black matrix is provided, among the regions to which voltages are applied according to states to be displayed, those regions which correspond to the openings of the black matrix correspond to the picture element regions, strictly speaking.

With reference to FIGS. 1(a) and (b), the structure of one picture element region of a liquid crystal display device 100 according to the present embodiment will be described. In the following, color filters and a black matrix are omitted for simplicity of description. Moreover, in the following figures, those constituent elements which have substantially identical functions to those of the constituent elements of the liquid crystal display device 100 will be indicated by identical reference numerals, and the descriptions thereof will be omitted. FIG. 1(a) is an upper plan view of the picture element region as seen from a substrate normal direction. FIG. 1(b) corresponds to a cross-sectional view taken along line 1B-1B' in FIG. 1(a). FIG. 1(b) shows a state where no voltage is applied across the liquid crystal layer.

The liquid crystal display device 100 includes an active matrix substrate (hereinafter referred to as a "TFT substrate") 100a, a counter substrate (also referred to as a "color filter substrate") 100b, and a liquid crystal layer 30 which is provided between the TFT substrate 100a and the counter substrate 100b. The liquid crystal molecules 30a in the liquid crystal layer 30 have negative dielectric anisotropy. When no voltage is applied across the liquid crystal layer 30, because of vertical alignment films (not shown) serving as vertical alignment layers which are each provided on the surface of the TFT substrate 100a or the counter substrate 100b facing the liquid crystal layer 30, the liquid crystal molecules 30a are oriented vertically to the surface of each vertical alignment film, as shown in FIG. 1(b). In this case, the liquid crystal layer 30 is said to be in a vertical orientation state. However, depending on the type of vertical alignment film and the type of liquid crystal material, the liquid crystal molecules 30a of the liquid crystal layer 30 in a vertical orientation state may be slightly tilted from the normal of the surface of each vertical alignment film (surface of each substrate). In general, a state in which an axis of each liquid crystal molecule (also called the "axial direction") is oriented at an angle of about 85° or more with respect to the surface of a vertical alignment film is referred to as a vertical orientation state.

The TFT substrate 100a of the liquid crystal display device 100 includes a transparent substrate (e.g., a glass substrate) 11 and picture element electrodes 14 formed on its surface. The counter substrate 100b includes a transparent substrate (e.g., a glass substrate) 21 and a counter electrode 22 formed on its surface. In accordance with a voltage which is applied across a picture element electrode 14 and the counter electrode 22 opposing each other via the liquid crystal layer 30, the orientation state of the liquid crystal layer 30 changes in each picture element region. Display is performed by utilizing a phenomenon where the polarization state and amount of the light which is transmitted through the liquid crystal layer 30 vary in accordance with changes in the orientation state of the liquid crystal layer 30.

Note that the liquid crystal display device 100 of the present embodiment is a transmission-type liquid crystal display device, and each picture element region only has a transmission region in which transmission mode display is performed by utilizing light which enters through the TFT substrate 100a (typically light from a backlight). However, the present technology is also suitably used for a transflective-type liquid crystal display device. As will be described later, a reflection region in which reflection mode display is performed by utilizing light which enters through the counter substrate (typically external light) may also be provided in addition to the transmission region.

Next, the structure and actions of the picture element electrodes 14 of the liquid crystal display device 100 will be described.

As shown in FIGS. 1(a) and (b), each picture element electrode 14 has a solid portion 14a formed of an electrically-conductive film (e.g., an ITO film) and a non-solid portion 14b in which no electrically-conductive film is formed.

The solid portion 14a includes a plurality of regions (referred to as "unit solid portions") 14a1, each of is substantially surrounded by the non-solid portion 14b. The unit solid portions 14a1 are arranged along a certain direction (a direction indicated by arrow D1 in FIG. 1(a)) in the picture element region. In the present embodiment, each unit solid portion 14a1 is generally square. The solid portion 14a further includes connecting portions 14a2, each of which connects between two adjoining unit solid portions 14a1. Each connecting portion 14a2 is located between unit solid portions 14a1 so as to bridge between the two unit solid portions 14a1, and typically is formed of the same electrically-conductive film as that of the unit solid portions 14a1.

The non-solid portion 14b includes: a frame portion 14b1, which is provided in the form of a frame along the outer periphery of the picture element electrode 14; and recess portions 14b2, each of which is located further inside of the frame portion 14b1 and cuts into the solid portion 14a so as to compartmentalize the unit solid portions 14a1. The non-solid portion 14b including the frame portion 14b1 and the recess portions 14b2 is formed by patterning an electrically-conductive film to become the picture element electrode 14.

When a voltage is applied between the picture element electrode 14 and the counter electrode 22 constructed as above, an oblique electric field which is generated in the neighborhood of the unit solid portions 14a1 (near outer periphery), i.e., edges of the non-solid portion 14b, causes a plurality of liquid crystal domains to be formed, each having a radially-inclined orientation. One liquid crystal domain is formed above each unit solid portion 14a1.

The mechanism by which liquid crystal domains are formed by the aforementioned oblique electric field will be described with reference to FIGS. 2(a) and (b). FIGS. 2(a) and (b) show states where a voltage is applied across the liquid crystal layer 30. FIG. 2(a) schematically shows a state where the orientation of the liquid crystal molecules 30a has begun to change (ON initial state) in accordance with a voltage which is applied across the liquid crystal layer 30. FIG. 2(b) schematically shows the orientation of the liquid crystal molecules 30a, which varied in accordance with the applied voltage, having reached a stationary state. Curves EQ in FIGS. 2(a) and (b) represent equipotential lines EQ.

When the picture element electrode 14 and the counter electrode 22 are at the same potential (i.e., no voltage is applied across the liquid crystal layer 30), as shown in FIG. 1(b), the liquid crystal molecules 30a in the picture element region are oriented vertically to the surfaces of both substrates 11 and 21. Note that, as will be described later, protrusions 23 are provided on the counter substrate 100b; therefore, in actuality, the orientation regulating force of each protrusion 23 causes the liquid crystal molecules 30a in the neighborhood of the protrusion 23 to be in an inclined orientation even in the absence of an applied voltage. In the following description, however, the orientation restriction force of the protrusion 23 will be ignored for simplicity of description. In FIGS. 2(a) and (b), the protrusion 23 is omitted, while ignoring its orientation regulating force.

When a voltage is applied across the liquid crystal layer 30, a potential gradient that is represented by the equipotential lines EQ (which are orthogonal to electric lines of force) EQ shown in FIG. 2(a) is formed. The equipotential lines EQ run parallel to the surfaces of the solid portion 14a and the counter electrode 22 while within the liquid crystal layer 30 that is located between the solid portion 14a of the picture element electrode 14 and the counter electrode 22, and fall while in the region corresponding to the non-solid portion 14b of the picture element region. In the liquid crystal layer 30 above the edges (neighborhood of the inner side of the non-solid portion 14b, including the boundary between the non-solid portion 14b and the solid portion 14a) EG of the non-solid portion 14b, an oblique electric field represented by tilted equipotential lines EQ is formed.

Each liquid crystal molecule 30a having negative dielectric anisotropy receives a torque which causes the axial direction of the liquid crystal molecule 30a to be oriented in parallel to the equipotential lines EQ (perpendicular to the electric line of forces). Therefore, as shown by arrows in FIG. 2(a), the liquid crystal molecules 30a above the edges EG are tilted (rotated) in a clockwise direction at the left edge EG in the figure, and in a counterclockwise direction at the right edge EG in the figure, thus being oriented so as to be parallel to the equipotential lines EQ.

Now, referring to FIGS. 3(a) to (d), changes in the orientation of the liquid crystal molecules 30a will be specifically described.

When an electric field is generated in the liquid crystal layer 30, each liquid crystal molecule 30a having negative dielectric anisotropy receives a torque which causes its axial direction to be oriented in parallel to the equipotential lines EQ. As shown in FIG. 3(a), when an electric field represented by an equipotential line EQ that is perpendicular to the axial direction of a liquid crystal molecule 30a occurs, the liquid crystal molecule 30a receives a torque which causes a tilt in the clockwise or counterclockwise direction with an equal probability. Therefore, within the liquid crystal layer 30 that is present between opposing electrodes which are in a parallel-plate type arrangement, liquid crystal molecules 30a which receive a torque in the clockwise direction and liquid crystal molecules 30a which receive a torque in the counterclockwise direction are both present. This may prevent a smooth change to an orientation state which is in accordance with the voltage applied across the liquid crystal layer 30.

As shown in FIG. 2(a), if an electric field (oblique electric field) which is represented by equipotential lines EQ that are tilted with respect to the axial directions of the liquid crystal molecules 30a is generated at the edges EG of the non-solid portion 14b of the liquid crystal display device 100, then, as shown in FIG. 3(b), each liquid crystal molecule 30a will tilt in a direction which will require a smaller amount of tilt for becoming parallel to the equipotential lines EQ (i.e., counterclockwise in the example shown in the figure). On the other hand, those liquid crystal molecules 30a which are located in regions where an electric field which is represented by equipotential lines EQ that are perpendicular to the axial directions of the liquid crystal molecules 30a occurs will, as shown in FIG. 3(c), be tilted in the same direction as the liquid crystal molecules 30a that are located on the tilted equipotential lines EQ, so as to have a continuous (matching) orientation with the liquid crystal molecules 30a located on the tilted equipotential lines EQ. As shown in FIG. 3(d), if an electric field is applied such that the equipotential lines EQ present an up-and-down shape, the liquid crystal molecules 30a located on the flat equipotential lines EQ will be oriented so as to match the orientation direction as restricted by the liquid crystal molecules 30a which are located on the respective tilted equipotential lines EQ. Note that, to be "located on an equipotential line EQ" means to be "located within an electric field which is represented by the equipotential line EQ".

As described above, if a change in orientation that begins from the liquid crystal molecules 30a located on the tilted equipotential lines EQ proceeds until reaching a stationary state, an orientation state which is schematically shown in FIG. 2(b) results. The liquid crystal molecules 30a which are located in a central portion of the unit solid portion 14a1 will receive almost similar influences of the orientations of the liquid crystal molecules 30a on both edges EG, and therefore maintain an orientation state which is perpendicular to the equipotential lines EQ. The liquid crystal molecules 30a in regions away from the center of the unit solid portion 14a1 will be tilted under the influence of the orientation of the liquid crystal molecules 30a at the respective closer edge EG, thus forming an inclined orientation which is symmetric with respect to the center SA of the unit solid portion 14a1. This orientation state is such that, when seen from a direction perpendicular to the display surface of the liquid crystal display device 100 (i.e., the direction perpendicular to the surfaces of the substrates 11 and 21), the axial directions of the liquid crystal molecules 30a are radially oriented (not shown) with respect to the center of the unit solid portion 14a1. Therefore, in the present specification, such an orientation state will be referred to as a "radially-inclined orientation". Moreover, any region of the liquid crystal layer 30 which takes a radially-inclined orientation with respect to a single center will be referred to as a liquid crystal domain.

The radially-inclined orientation in the liquid crystal domain which is formed on the unit solid portion 14a1 and the orientation in the liquid crystal layer 30 above the non-solid portion 14a1 are continuous with each other, such that they are oriented so as to match the orientations of the liquid crystal molecules 30a at the edges EG of the non-solid portion 14b. Therefore, disclination lines (orientation defects) will not be formed at the boundary therebetween to cause deterioration in display quality associated with disclination lines.

As described above, each picture element electrode 14 of the liquid crystal display device 100 has the non-solid portion 14b, in which no electrically-conductive film is formed. Thus, in the liquid crystal layer 30 within the picture element region, the picture element electrode 14 forms an electric field which is represented by equipotential lines EQ having tilted regions. The liquid crystal molecules 30a being in the liquid crystal layer 30 and having negative dielectric anisotropy, which are in a vertical orientation state in the absence of an applied voltage, change their orientation directions in response to a change in orientation of the liquid crystal molecules 30a which are located on the tilted equipotential lines EQ, whereby a liquid crystal domain having a stable radially-inclined orientation is formed on the unit solid portion 14a1. As the orientations of the liquid crystal molecules in this liquid crystal domain are changed in accordance with a voltage which is applied across the liquid crystal layer, display is performed.

Now, the shape of the unit solid portion 14a1 of the picture element electrode 14 (the shape as seen from the substrate normal direction) will be described.

The display characteristics of a liquid crystal display device exhibit azimuth angle dependence due to the orientation states (optical anisotropy) of liquid crystal molecules. In order to reduce the azimuth angle dependence of display characteristics, it is preferable that the liquid crystal molecules are oriented with similar probabilities for all azimuth angles. It is further preferable that the liquid crystal molecules in each picture element region are oriented with similar probabilities for all azimuth angles. Therefore, it is preferable that each unit solid portion 14a1 is shaped so as to form a liquid crystal domain such that the liquid crystal molecules 30a in the liquid crystal domain formed corresponding to the unit solid portion 14a1 are oriented with similar probabilities for all azimuth angles. Specifically, the shape of each unit solid portion 14a1 preferably has rotational symmetry with an axis of symmetry at its center (normal direction) (preferably a symmetry of two-fold rotational symmetry or more, and more preferably a symmetry of four-fold rotational symmetry or more). In other words, the non-solid portion 14b is to be formed so that the unit solid portion 14a1 will have a shape as described above.

The orientation states of the liquid crystal molecules 30a in the case where the unit solid portion 14a1 is generally square as shown in FIG. 1(a) will be described with reference to FIGS. 4(a) to (c).

FIGS. 4(a) to (c) each schematically show an orientation state of the liquid crystal molecules 30a as seen from a substrate normal direction. In the figures showing the orientation states of the liquid crystal molecules 30a as seen from the substrate normal direction (such as FIGS. 4(b) and (c)), any liquid crystal molecule 30a which is illustrated as an ellipse having a black end indicates that the liquid crystal molecule 30a is tilted so that the said end is closer, than is the other end, to the substrate on which the picture element electrode 14 is provided. The same also applies to the following figures.

When the picture element electrode 14 and the counter electrode 22 are at the same potential, i.e., when no voltage is applied across the liquid crystal layer 30, those liquid crystal molecules 30a whose orientation directions are regulated by the vertical alignment layers (not shown) which are each provided on the surface of the TFT substrate 100a or the counter substrate 100b facing the liquid crystal layer 30 take a vertical orientation state, as shown in FIG. 4(a).

When an electric field is applied across the liquid crystal layer 30 and an electric field as represented by the equipotential lines EQ shown in FIG. 2(a) is generated, the liquid crystal molecules 30a having negative dielectric anisotropy are subjected to a torque which causes their axial directions to become parallel to the equipotential lines EQ. As has been described with reference to FIGS. 3(a) and (b), those liquid crystal molecules 30a which are under an electric field represented by equipotential lines EQ that are perpendicular to the molecular axes of the liquid crystal molecules 30a do not have a singularly defined direction in which the liquid crystal molecules 30a are to tilt (rotate) (FIG. 3(a)), and therefore do not easily undergo a change in orientation (tilt or rotation). On the other hand, those liquid crystal molecules 30a under equipotential lines EQ that are tilted with respect to the molecular axes of the liquid crystal molecules 30a have a singularly defined tilt (rotation) direction, and thus easily undergo a change in orientation. Therefore, as shown in FIG. 4(b), the liquid crystal molecules 30a begin to tilt from the edges of the non-solid portion 14b, where the molecular axes of the liquid crystal molecules 30a are tilted with respect to the equipotential lines EQ. Then, as has been described with reference to FIG. 3(c), the surrounding liquid crystal molecules 30a are also tilted so as to match the orientations of the tilted liquid crystal molecules 30a at the edges of the non-solid portion 14b, and the axial directions of the liquid crystal molecules 30a become stable in a state as shown in FIG. 4(c) (radially-inclined orientation).

Thus, if the unit solid portion 14a1 is of a shape having rotational symmetry, the liquid crystal molecules 30a in the picture element region will be tilted from the edges of the non-solid portion 14b (neighborhood of the unit solid portion 14a1) toward the center of the unit solid portion 14a1 under an applied voltage. Therefore, the liquid crystal molecules 30a near the center of the unit solid portion 14a1 where the orientation regulating forces from the liquid crystal molecules 30a at the edges are at equilibrium will maintain a state of being oriented vertically to the substrate plane, whereas the surrounding liquid crystal molecules 30a will be gradually radially inclined around the liquid crystal molecules 30a near the center of the unit solid portion 14a1.

Note that the radially-inclined orientation of liquid crystal molecules 30a is more stable when it is a counterclockwise or clockwise spiral radially-inclined orientation as shown in FIGS. 5(b) and (c) than when it is a simple radially-inclined orientation as shown in FIG. 5(a). This spiral orientation is distinct from the usual twist orientation, where the orientation direction of the liquid crystal molecules 30a would change in a helical manner along the thickness direction of the liquid crystal layer 30. In the spiral orientation, when observed with respect to very small regions, the orientation directions of the liquid crystal molecules 30a hardly change along the thickness direction of the liquid crystal layer 30. In other words, the same orientation state as that of FIG. 5(b) or (c) exists in a cross section taken at any position along the thickness direction of the liquid crystal layer 30 (cross section within a plane which is parallel to the layer plane), and hardly any twist deformation along the thickness direction of the liquid crystal layer 30 occurs. However, some degree of twist deformation does exist with respect to the entire liquid crystal domain.

When a material obtained by adding a chiral agent to a nematic liquid crystal material having negative dielectric anisotropy is used, under an applied voltage, the liquid crystal molecules 30a take a counterclockwise or clockwise spiral radially-inclined orientation as shown in FIGS. 5(b) and (c) around the unit solid portion 14a1. Whether it is clockwise or counterclockwise depends on the type of chiral agent. Therefore, by placing the liquid crystal layer 30 above the unit solid portion 14a1 in a spiral radially-inclined orientation under an applied voltage, the direction in which the radially-inclined liquid crystal molecules 30a turn around the liquid crystal molecules 30a which stand perpendicularly to the substrate plane can be kept constant within the entire liquid crystal domain, whereby a uniform display free of coarseness can be realized. Furthermore, since the direction of turning around the liquid crystal molecules 30a which stand perpendicularly to the substrate plane is defined, the response speed when applying a voltage across the liquid crystal layer 30 is also improved.

Moreover, when an increased amount of chiral agent is added, the orientations of the liquid crystal molecules 30a will change in a helical manner along the thickness direction of the liquid crystal layer 30, as in the case of the usual twist orientation. In an orientation state where the orientations of the liquid crystal molecules 30a do not change in a helical manner along the thickness direction of the liquid crystal layer 30, those liquid crystal molecules 30a which are oriented in a direction perpendicular to or a direction parallel to the polarization axis of a polarizer do not impart a phase difference to incident light, and therefore incident light which travels through any region in such an orientation state does not contribute to transmittance. On the other hand, in an orientation state where the orientations of the liquid crystal molecules 30a change in a helical manner along the thickness direction of the liquid crystal layer 30, those liquid crystal molecules 30a which are oriented in a direction perpendicular to or a direction parallel to the polarization axis of a polarizer also impart a phase difference to incident light, and make it possible to utilize optical rotary action of light. Therefore, incident light which travels through a region in such an orientation state also contributes to transmittance, whereby a liquid crystal display device capable of performing bright display can be obtained.

Although FIG. 1(a) illustrates an example where each unit solid portion 14a1 is generally square, the shape of the unit solid portion 14a1 is not limited thereto. For example, as in a picture element electrode 14A shown in FIG. 6(a), the unit solid portion 14a1 may be generally rectangular, or as in a picture element electrode 14B shown in FIG. 6(b), a generally square unit solid portion 14a1 and generally rectangular unit solid portions 14a1 may be used in combination. Since the shape of the picture element region is typically approximated to a rectangle, the shape of the unit solid portion 14a1 may be made generally square and/or generally rectangular in accordance with the aspect ratio of the picture element region, thus making it possible to efficiently place the unit solid portions 14a1 within the picture element region.

Moreover, as in picture element electrodes 14C and 14D shown in FIGS. 7(a) and (b), the unit solid portion 14a1 may be a generally rectangular shape having generally arc-shaped corners. The picture element electrode 14C shown in FIG. 7(a) includes generally square unit solid portions 14a1 having generally arc-shaped corners, whereas the picture element electrode 14D shown in FIG. 7(b) includes generally rectangular unit solid portions 14a1 having generally arc-shaped corners. Since the unit solid portions 14a1 of these picture element electrodes 14C and 14D have generally arc-shaped corners, the change in the orientation directions of the liquid crystal molecules at the corners is more gradual (smoother) and the orientation stability is higher, as compared to any rectangular unit solid portions 14a1 having right corners. Note that, in order to further enhance the continuity of orientation, the shape of the unit solid portion 14a1 may be made generally circular or generally elliptical.

Next, the structure and function of the protrusions 23 provided on the counter substrate 100b will be described.

As shown in FIGS. 1(a) and (b), the counter substrate 100b has protrusions 23 which are provided on the counter electrode 22 and protrude toward the liquid crystal layer 30. Each protrusion 23 is provided in a region corresponding to a vicinity of a center of a liquid crystal domain (i.e., a region corresponding to a central portion of the unit solid portion 14a1). On the surface of the counter substrate 100b facing the liquid crystal layer 30, a vertical alignment film (not shown) is provided so as to cover the protrusions 23 and the counter electrode 22.

Figure 8:
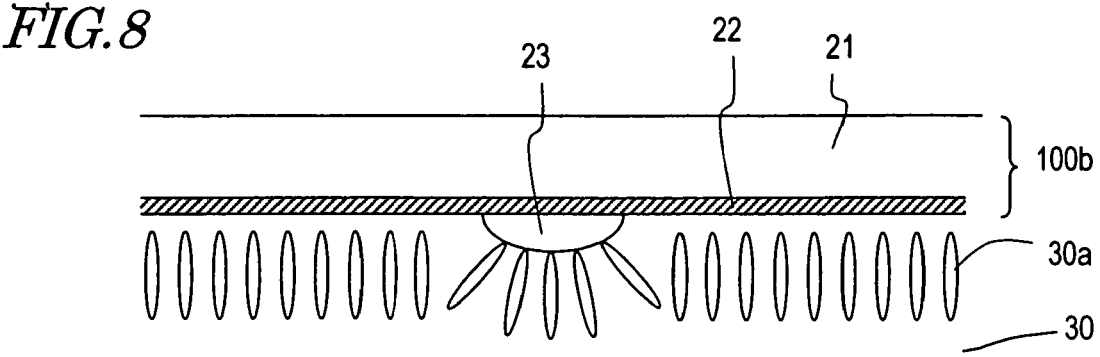
FIG. 8 is an enlarged cross-sectional view schematically showing the neighborhood of a protrusion 23 of a counter substrate 100b of the liquid crystal display device 100.

FIG. 8 shows the neighborhood of a protrusion 23 on the counter substrate 100b in an enlarged view. As shown in FIG. 8, with the shape effect of its surface (which has a vertical alignment property), the protrusion 23 places the liquid crystal molecules 30a in a radially-inclined orientation. Since the protrusion 23 is provided in a region corresponding to a vicinity of a center of the liquid crystal domain, the tilting directions of the liquid crystal molecules ascribable to the protrusion 23 match the orientation directions in a radially-inclined orientation of the liquid crystal domain which is formed in the region corresponding to the unit solid portion 14a1. The protrusion 23 exhibits an orientation regulating force irrespective of whether a voltage is applied or not.

Although there are no particular limits to the material composing the protrusions 23, they would be easily formed by using a dielectric material such as resin. Use of a resin material which deforms with heat is preferable because protrusions 23 of a gentle hill-like cross-sectional shape as shown in FIG. 8 can be easily formed through a heat treatment after patterning. As shown in the figure, protrusions 23 having a gentle cross-sectional shape with an apex (e.g., a part of a sphere) and protrusions having a conical shape excel in the effect of fixing the center position of radially-inclined orientation.

Since the liquid crystal display device 100 includes the picture element electrodes 14 whose outer shape is defined so as to exhibit orientation regulating forces for forming liquid crystal domains on the unit solid portions 14a1, as well as protrusions 23 which exhibit orientation regulating forces that match the orientation regulating forces of the picture element electrodes 14, a stable radially-inclined orientation can be obtained. This is schematically illustrated in FIGS. 9(a) to (c). FIG. 9(a) shows absence of an applied voltage; FIG. 9(b) shows a state where the orientation has begun to change (ON initial state) after application of a voltage; and FIG. 9(c) schematically shows a stationary state under an applied voltage.

As shown in FIG. 9(a), the orientation regulating force from each protrusion 23 acts on the liquid crystal molecules 30a in its neighborhood and forms a radially-inclined orientation even in the absence of an applied voltage.

When a voltage begins to be applied, an electric field represented by equipotential lines EQ as shown in FIG. 9(b) is generated (owing to the electrode structure on the TFT substrate 100a), and a liquid crystal domain in which the liquid crystal molecules 30a are in a radially-inclined orientation is formed in a region corresponding to the unit solid portion 14a1, and reaches a stationary state as shown in FIG. 9(c). At this time, the tilting directions of the liquid crystal molecules 30a in each liquid crystal domain coincide with the tilting directions of the liquid crystal molecules 30a ascribable to the orientation regulating force of the protrusion 23 provided in the corresponding region.

When a stress is applied to the liquid crystal display device 100 in a stationary state, the radially-inclined orientation in the liquid crystal layer 30 is once lost. However, when the stress is removed, the radially-inclined orientation state is restored because the orientation restriction forces from the unit solid portion 14a1 and the protrusion 23 are acting on the liquid crystal molecules 30a.

As for the construction of the liquid crystal display device 100 of the present embodiment, the same construction as that of a known vertical-alignment type liquid crystal display device can be adopted except that each picture element electrode 14 is patterned into a predetermined shape to have the solid portion 14a and the non-solid portion 14b. A known production method can be used for production.

Typically, in order to realize a vertical orientation of liquid crystal molecules having negative dielectric anisotropy, vertical alignment films (not shown) serving as vertical alignment layers are each formed on the surface of the picture element electrode 14 or the counter electrode 22 facing the liquid crystal layer 30.

As the liquid crystal material, a nematic liquid crystal material having negative dielectric anisotropy is used. By adding a dichroic dye to a nematic liquid crystal material having negative dielectric anisotropy, a guest-host mode liquid crystal display device could also be obtained. A guest-host mode liquid crystal display device does not require polarizers.

A so-called vertical-alignment type liquid crystal display device, comprising a liquid crystal layer in which liquid crystal molecules having negative dielectric anisotropy are in a vertical orientation in the absence of an applied voltage, is able to perform display in various display modes. For example, in addition to a birefringence mode which performs display by controlling the birefringence of the liquid crystal layer with an electric field, an optical rotation mode, or a combination of an optical rotation mode and a birefringence mode may be adopted as the display mode. By providing a pair of polarizers on the outer sides (i.e., the opposite side from the liquid crystal layer 30) of the pair of substrates (e.g., a TFT substrate and a counter substrate) in any one of the aforementioned liquid crystal display devices, a birefringence mode liquid crystal display device can be obtained. Moreover, as necessary, a phase difference compensation element (which typically is a phase difference plate) may be provided. Furthermore, a bright liquid crystal display device can also be obtained by employing substantially circularly-polarized light.

As has been described above, the liquid crystal display device 100 provides a stable radially-inclined orientation because the orientation regulating force from the picture element electrode 14 and the orientation regulating force from the protrusion 23 cooperate to cause the liquid crystal molecules to be oriented. However, if a stress which is applied to the liquid crystal display device 100 is large, a long time will be required for returning from a disturbed orientation state to a normal orientation state, thus allowing a viewer to perceive a degradation in display quality. The inventors have conducted various studies concerning this problem to find that this problem is attributable to the typical electrode structures in the CPA method.

In the CPA method, as shown in FIG. 1(a) and the like, the unit solid portions 14a1 are interconnected by the connecting portions 14a2. According to the studies of the inventors, when a stress is applied to the liquid crystal display device 100, the center of orientation of the radially-inclined orientation may be shifted from near the center of a unit solid portion 14a1 onto a connecting portion 14a2 and fixed at that position, never coming back onto the unit solid portion 14a1. This is illustrated in FIGS. 10(a) and (b). FIG. 10(a) is a micrograph showing a state of a liquid crystal domain before stress is applied; and FIG. 10(b) is a micrograph showing a state of the liquid crystal domain after stress is applied.

As shown in FIG. 10(a), before stress application, the center of the radially-inclined orientation (shown by + in the figure) is located at the central portion of a unit solid portion 14a1 (near the center of a cross-like extinction pattern). On the other hand, after stress application, the center of orientation is located on a connecting portion 14a2, as shown in FIG. 10(b). As compared to the state where the center of orientation is located on the center of the unit solid portion 14a1 (i.e., the state shown in FIG. 10(a)), the state where the center of orientation is located on the connecting portion 14a2 (i.e., the state shown in FIG. 10(b)) has a low rotational symmetry in terms of probability of presence of the liquid crystal molecules. Therefore, if the center of orientation remains shifted onto the connecting portion 14a2 for a long time, the viewing angle characteristics will be deteriorated.

In order to suppress the deterioration in display quality associated with the aforementioned phenomenon, the inventors have produced CPA-type liquid crystal display devices having the basic construction shown in FIGS. 1(a) and (b), while changing their cell parameters, and evaluated their anti-pressure property. As a result, it has been found that anti-pressure property can be greatly improved by prescribing the value of the length of the unit solid portion 14a1, the interval of the unit solid portions 14a1, or the height of the protrusion 23 to be within a predetermined range. Hereinafter, the evaluation results will be described more specifically.

First, FIG. 11 shows results of measuring a voltage at which a trace of a pressing (a disturbance in orientation in the pressed portion) disappears (hereinafter referred to as a "trace-disappearing voltage"), the measurements being taken while varying the length of the unit solid portion 14a2. A trace of a pressing is more likely to disappear when the applied voltage is lower, and less likely to disappear when the applied voltage is higher. Therefore, the higher the trace-disappearing voltage is, the better the anti-pressure property is.

The trace-disappearing voltage was measured as follows. As shown in FIG. 12, when the liquid crystal display device 100 (with a predetermined voltage being applied across the liquid crystal layer 30) was pressed at 500 gf for 2 seconds via a length 10 mm×width 10 mm×thickness 3 mm piece of silicone rubber, it was examined whether the trace would disappear within 30 seconds, and the highest voltage at which the trace disappeared within the seconds was defined as the trace-disappearing voltage. If the trace disappears within 30 seconds in the pressure test under the aforementioned conditions, the viewer will hardly perceive a degradation in display quality when a stress is applied to the liquid crystal panel in normal use (e.g., when wiping dirt off the display surface or when a child inadvertently touches the display surface).

The length of the unit solid portion 14a1 as mentioned herein is, as shown in FIG. 1(a), the length L of each unit solid portion 14a1 along a direction D1 in which they are arranged (i.e., the direction along which the connecting portions 14a1 extend). The cell parameters of the liquid crystal display devices used for evaluation were as shown in Table 1.

TABLE 1

| Thickness of Liquid Crystal Layer (Cell Thickness) | Height of Protrusion | Gray Scale Voltage corresponding to White Displaying State (White Voltage) | Gray Scale Voltage corresponding to Black Displaying State (Black Voltage) |
| --- | --- | --- | --- |
| 3.6 μm | 1.4 μm | about 4.0 V | about 1.6 V |
| Resolution (ppi) | | | |
| 75, 125, 150, 200, 250, 300 | | | |

Firstly, it is seen from FIG. 11 that as the length L of the unit solid portion 14a1 decreases, the trace-disappearing voltage increases and the anti-pressure property becomes more enhanced. This is considered because, as the length L of the unit solid portion 14a1 becomes shorter, the distance from the center of the unit solid portion 14a1 to the connecting portion 14a2 becomes shorter, so that the shifted center of orientation is more likely to return from the connecting portion 14a2 to the center of the unit solid portion 14a1.

It is also seen from FIG. 11 that, when the length L of the unit solid portion 14a1 is about 70 μm or less, the trace-disappearing voltage becomes almost constant at a high level (e.g., about 3.7 to 3.8V in this case). Therefore, by prescribing the length L of the unit solid portion 14a1 to be 70 μm or less, deterioration in display quality caused by a pressing on the liquid crystal panel can be adequately suppressed.

Note that, as shown in FIG. 11, the anti-pressure property improving effect obtained by reducing the length L of the unit solid portion 14a1 is almost constant at 70 μm or less. Therefore, the length L of the unit solid portion 14a1 may preferably be in the range of 70 μm or less. Within this range, an optimum value may be selected while paying attention to other characteristics (e.g., aperture ratio), in accordance with the size of the picture element region.

Figure 13:
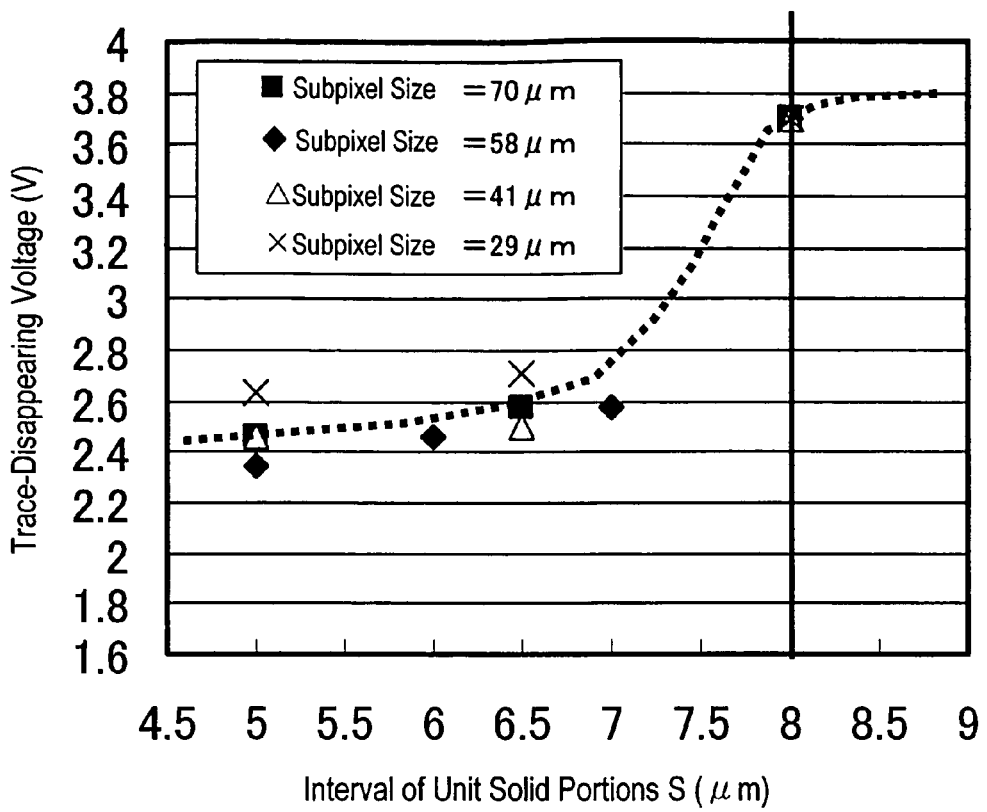
FIG. 13 is a graph showing results of measuring a trace-disappearing voltage while varying the interval S between unit solid portions 14a1.

Next, FIG. 13 shows results of measuring a trace-disappearing voltage while varying the interval S between unit solid portions 14a1 along the direction D1 in which the unit solid portions 14a1 are arranged (corresponding to the length of each connecting portion 14a2 along the arranging direction D1). The cell parameters of the liquid crystal display devices used herein are as shown in Table 2.

TABLE 2

| Thickness of Liquid Crystal Layer (Cell Thickness) | Height of Protrusion | Gray Scale Voltage corresponding to White Displaying State (White Voltage) | Gray Scale Voltage corresponding to Black Displaying State (Black Voltage) |
| --- | --- | --- | --- |
| 3.6 μm | 1.4 μm | about 4.0 V | about 1.6 V |
| Length L of Unit Solid Portion (μm) | | | |
| 29, 41, 58, 70 | | | |

Firstly, it is seen from FIG. 13 that as the interval S between unit solid portions 14a1 increases, the trace-disappearing voltage increases and the anti-pressure property becomes more enhanced. This is considered because, as the interval S between unit solid portions 14a1 becomes larger, the width of the non-solid portion 14b between unit solid portions 14a1 (i.e., the recess portions 14b2) becomes larger, so that a strong oblique electric field is generated under an applied voltage, thus exhibiting a strong orientation regulating force.

Moreover, it can be seen from FIG. 13 that, when the interval S between unit solid portions 14a1 is about 8.0 μm or more, the trace-disappearing voltage becomes almost constant at a high level (about 3.8V). Therefore, by prescribing the interval S between unit solid portions 14a1 to be 8.0 μm or less, deterioration in display quality caused by a pressing on the liquid crystal panel can be adequately suppressed.

Note that the interval S between unit solid portions 14a1 may deviate from the design value due to fluctuations in the manufacturing process. According to a study of the inventors, in the case where ITO is used as the material of the electrically-conductive film of the picture element electrode 14, for example, the edges of the solid portion 14a may deviate from the designed positions by 0.25 μm at the most. Therefore, when allowing for a margin for the aforementioned fluctuations, it is preferable to prescribe the interval S between unit solid portions 14a1 to be 8.5 μm (8.0 μm+(0.25 μm×2)) or more.

Moreover, as shown in FIG. 13, the anti-pressure property improving effect obtained by increasing the interval S between unit solid portions 14a1 is almost constant at 8.0 μm or more; however, excessively increasing the interval S will result in a reduced aperture ratio. Therefore, it is preferable that the interval S between unit solid portions 14a1 is not too large while remaining within the range of 8.0 μm or more (or 8.5 μm, in the case of allowing for a margin for fluctuations during production).

Figure 14:
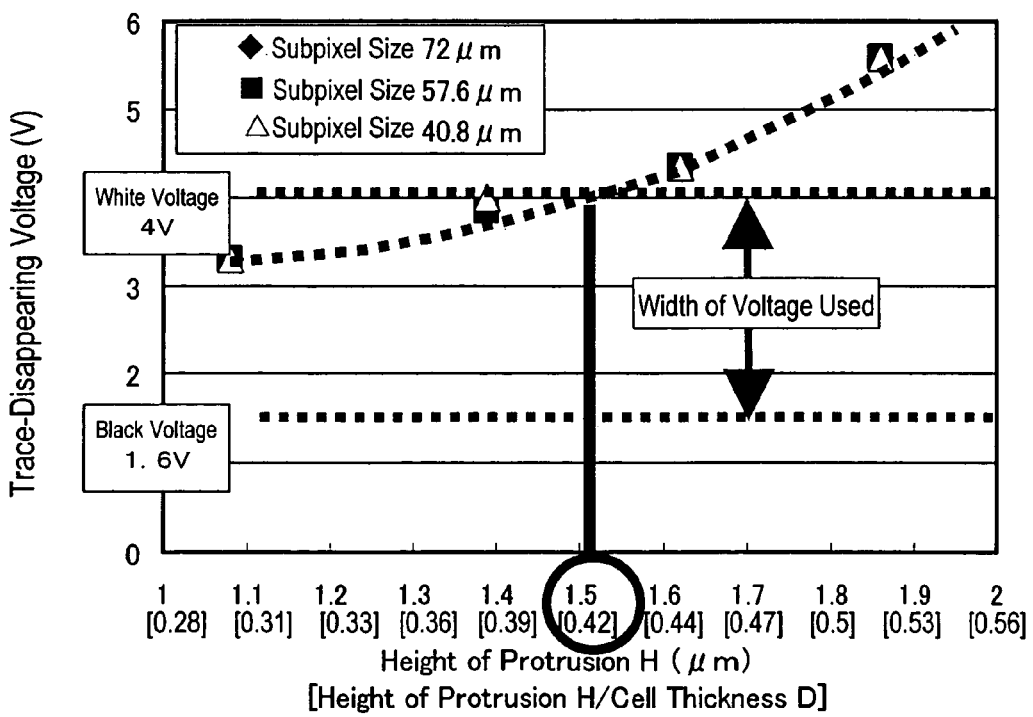
FIG. 14 is a graph showing results of measuring a trace-disappearing voltage while varying the height H of protrusions 23.

Next, FIG. 14 shows results of measuring a trace-disappearing voltage while varying the height H of the protrusion 23. On the horizontal axis of FIG. 14, not only the height H of the protrusion 23, but also a value H/D obtained by normalizing the height H of the protrusion 23 by the cell thickness (thickness of the liquid crystal layer 30) D (i.e., a ratio of the height H of the protrusion 23 to the cell thickness D) is shown. The cell parameters of the liquid crystal display device used herein are as shown in Table 3.

TABLE 3

| Thickness of Liquid Crystal Layer (Cell Thickness) | Interval between Unit Solid Portions | Gray Scale Voltage corresponding to White Displaying State (White Voltage) | Gray Scale Voltage corresponding to Black Displaying State (Black Voltage) |
|---|---|---|---|
| 3.6 μm | 8.0 μm | about 4.0 V | about 1.6 V |
| | Length L of Unit Solid Portion (μm) | | |
| | 40.8, 57.6, 72 | | |

Firstly, it is seen from FIG. 14 that as the height H of the protrusion 23 increases and H/D increases, the trace-disappearing voltage increases and the anti-pressure property becomes more enhanced. This is considered because, as the height H of the protrusion 23 increases, and as H/D increases, the orientation regulating force from the protrusion 23 becomes stronger. For example, when the height H of the protrusion 23 is increased while keeping the cell thickness D constant, the surface area of the protrusion 23 increases so that the number of liquid crystal molecules which directly receive the orientation regulating force from the surface of the protrusion 23 increases, whereby the orientation regulating force becomes stronger. On the other hand, when the cell thickness D is decreased while keeping the height H of the protrusion 23 constant, the probability of presence of those liquid crystal molecules within the liquid crystal layer 30 which directly receive the orientation regulating force from the surface of the protrusion 23 increases, so that the orientation regulating force also becomes stronger.

It is also seen from FIG. 14 that, when the height H of the protrusion 23 is about 1.5 μm or more (i.e., H/D is about 0.42 (≈1.5/3.6) or more), no trace of a pressing will be left at any level of voltage that will actually be used as a gray scale voltage. Therefore, by prescribing the height H of the protrusion 23 to be 1.5 μm or more, or prescribing H/D to be 0.42 or more, deterioration in display quality caused by a pressing on the liquid crystal panel can be adequately suppressed.

Note that the height H of the protrusion 23 may deviate from the design value due to fluctuations in the manufacturing process. According to a study of the inventors, in the case where a resin is used as the material of the protrusion 23, for example, the height of the protrusion 23 may deviate from the design value by 0.2 μm at the most. Therefore, when allowing for a margin for the aforementioned fluctuations, it is preferable to prescribe the height of the protrusion 23 to be 1.7 μm or more, or prescribe H/D to be 0.47 (≈1.7/3.6) or more; and it is more preferable to prescribe the height of the protrusion 23 to be 1.9 μm or more, or prescribe H/D to be 0.53 (≈1.9/3.6) or more.

Since the protrusions 23 may also function as columnar spacers that define the cell thickness, the height of each protrusion 23 may preferably be in the range of 1.5 μm or more and equal to or less than the cell thickness (thickness of the liquid crystal layer 30), and H/D may preferably be in the range of no less than 0.42 and no more than 1. However, since the protrusions 23 will place the liquid crystal molecules 30a in a radially-inclined orientation even in the absence of an applied voltage, the protrusions 23 may cause leakage of light in a black displaying state under the normally black mode. Therefore, in the case where the contrast ratio is regarded as important, it is preferable to prescribe a low height H for the protrusions 23 within the aforementioned range.

As described above, deterioration in display quality caused by a pressing can be adequately suppressed if the liquid crystal display device satisfies at least one of conditions (1) to (3) below. Of course, from the standpoint of effectively suppressing deterioration in display quality, it is preferable that at least two of conditions (1) to (3) are satisfied, and it is even more preferable that all of the three are satisfied.

Condition (1) . . . the length L of the unit solid portion 14a1 is 70 μm or less Condition (2) . . . the interval S between unit solid portions 14a1 is 8.0 μm or more (more preferably 8.5 μm or less)

Condition (3) . . . height H of the protrusion 23/cell thickness D is 0.42 or more (more preferably 0.47 or more, and still more preferably 0.53 or more)

The liquid crystal display device has an excellent anti-pressure property as described above, and therefore can be suitably used for various electronic apparatuses. For example, it can be suitably used in a mobile electronic apparatus such as a PDA or a mobile phone, and in an electronic apparatus which does not have a protective plate such as an acrylic plate on the viewer's side of the counter substrate. Moreover, as has already been described, a trace of a pressing is more likely to disappear as the voltage applied across the liquid crystal layer 30 is lower. Therefore, even if a disturbance in orientation is caused by a pressing, the orientation will return to the normal state if a voltage which is close to the black voltage is applied thereafter. Therefore, the present technology will have a greater significance in an electronic apparatus which is likely to keep displaying the same image than in an electronic apparatus which frequently switches its displayed image.

Figure 15:
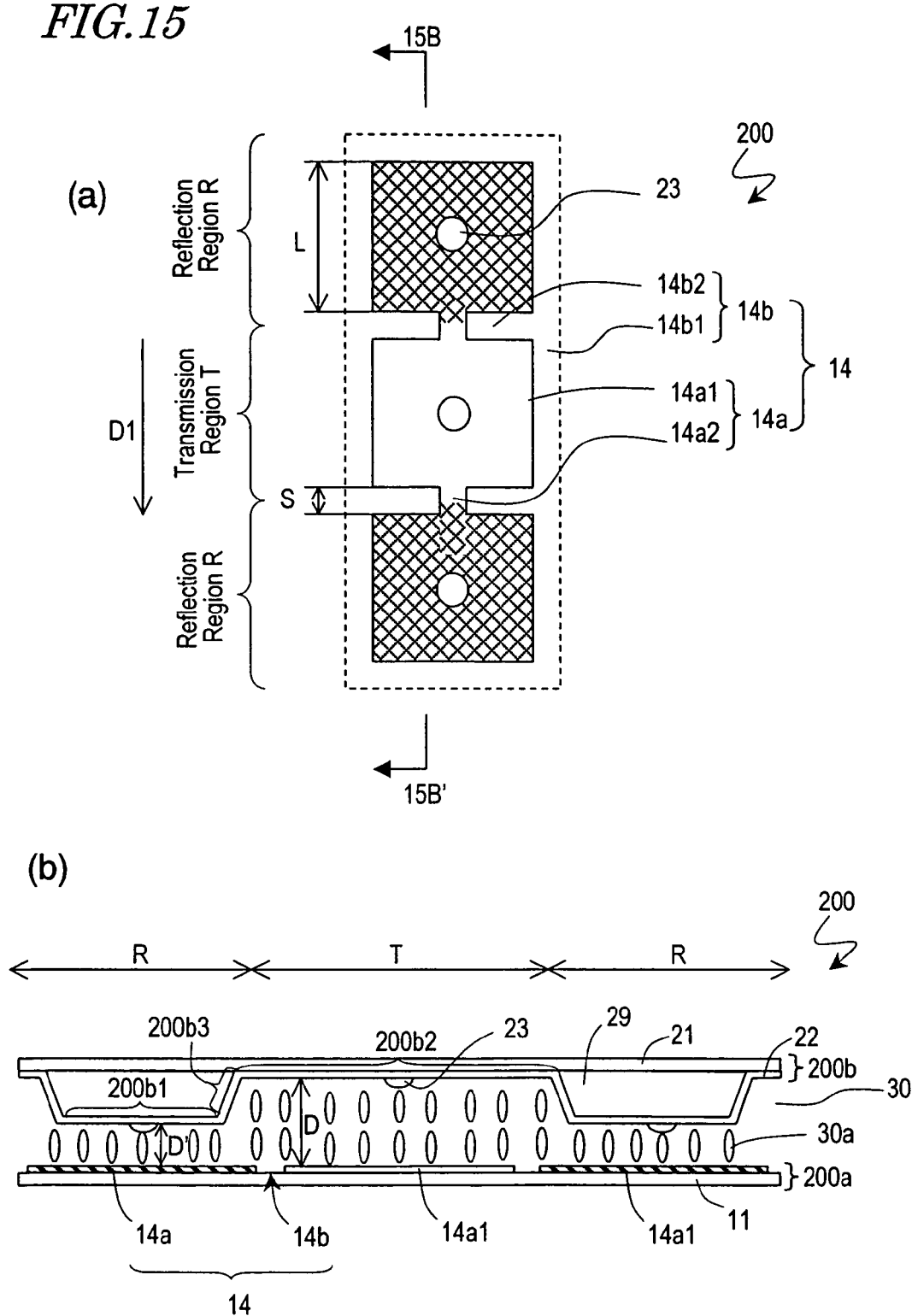
FIGS. 15(a) and (b) are diagrams schematically showing the structure of another liquid crystal display device 200, where
FIG. 15(b) is a cross-sectional view taken along line 15B-15B' in (a).

Although the present technology has been described with respect to a transmission-type liquid crystal display device as an example, the present technology can also be suitably used for a transflective-type liquid crystal display device. FIGS. 15(a) and (b) show a transflective-type liquid crystal display device 200.

A picture element region of the liquid crystal display device 200 shown in FIGS. 15(a) and (b) includes transmission regions T in which transmission-mode display is performed by using light entering through the TFT substrate 200a (which typically is light from a backlight), and reflection regions R in which reflection-mode display is performed by using light entering through the counter substrate 200b (which typically is external light). As shown (for example) in FIG. 15(a), a plurality of unit solid portions 14a1 are aligned in a first direction along an axis which is located essentially at a midpoint of opposing edges of the unit solid portions 14a1 with respect to a second direction. The second direction is orthogonal to the first direction. The connecting portion 14a2 is centered about an axis with respect to the second direction and indented in the second direction toward the axis with respect to the opposing edges of the unit solid portion 14a1.

Typically, the picture element electrode 14 includes a transparent electrode which is formed of a transparent electrically-conductive material (e.g. ITO) and reflection electrodes formed of an electrically-conductive material having light reflectiveness (e.g. aluminum), such that the transparent electrode defines the transmission region T and the reflection electrodes define the reflection regions R. If minute ruggednesses are provided on the surface of the reflection electrodes, it becomes possible to effect diffuse reflection of light with the reflection electrodes, whereby a white displaying state close to paper-white can be realized.

In the transmission-mode display, light which is used for displaying travels through the liquid crystal layer 30 only once, whereas in the reflection-mode display, light which is used for displaying travels through the liquid crystal layer 30 twice. As shown in FIG. 15(b), by making a thickness D' of the liquid crystal layer 30 in the reflection regions R smaller than a thickness D of the liquid crystal layer 30 in the transmission region T, it can be ensured that the retardation which is imparted by the liquid crystal layer 30 to the light used for the reflection mode is close to the retardation which is imparted by the liquid crystal layer 30 to the light used for the transmission mode. By prescribing the thickness D' of the liquid crystal layer 30 in the reflection regions R to be substantially ½ of the thickness D of the liquid crystal layer 30 in the transmission region T, it becomes possible to ensure that the retardations which are imparted by the liquid crystal layer 30 to the light used for both display modes are substantially equal.

In the present embodiment, the counter substrate 200b has level differences, each including: an upper-level face 200b1 which is located in a reflection region R; a lower-level face 200b2 which is located in a transmission region T; and a side face 200b3 which connects between the upper-level face 200b1 and the lower-level face 200b2. As a result, the thickness D' of the liquid crystal layer 30 in any reflection region R is made smaller than the thickness D of the liquid crystal layer 30 in any transmission region T. Specifically, the level difference of the counter substrate 200b is formed by providing a transparent dielectric layer 29 selectively in the reflection regions R of the counter substrate 200b. Each side face 200b3 of level difference is located in a reflection region R, and is covered by the counter electrode 22.

The transflective-type liquid crystal display device 200 of the aforementioned construction can also attain an excellent anti-pressure property by satisfying at least one of conditions (1) to (3). However, in the first place, the reflection regions R are regions which have a lower contrast ratio than the transmission regions T and their display characteristics requirements are low. Therefore, even if some disturbance in orientation occurs in the reflection regions R, there is little unfavorable influence on display. Therefore, as for condition (1), sufficient display quality can be obtained if the unit solid portions 14a1 located in the transmission regions T satisfy this condition, and as for condition (3), sufficient display quality can be obtained if the protrusions 23 located in the transmission regions T satisfy this condition. Of course, from the standpoint of further improving the display quality, it is preferable that conditions (1) or (3) are satisfied also with respect to the unit solid portions 14a1 and the protrusions 23 located in the reflection regions R.

While the liquid crystal display device 200 shown in FIGS. 15(a) and (b) realizes a multi-gap structure by providing level differences in the counter substrate 200b, a multi-gap structure may be realized, as in the liquid crystal display device 300 shown in FIG. 16, by providing level differences in a TFT substrate 300a, without providing level differences in a counter substrate 300b. The TFT substrate 300a of the liquid crystal display device 300 has an insulative film 19 which is provided under reflection electrodes, thus forming level differences. As shown in FIGS. 15(a) and (b), adopting a structure where level differences are provided in the counter substrate 200b can simplify manufacture of the TFT substrate 200a.

In the case where a multi-gap structure is adopted, each side face of level difference is tilted against the substrate plane, and therefore those liquid crystal molecules which are oriented perpendicularly with respect to such side faces cause leakage of light in a black displaying state, thus lowering the contrast ratio. However, in the liquid crystal display device 200, as shown in FIG. 15(b), each side face 200b3 of level difference is located in a reflection region R, and therefore a decrease in contrast ratio does not occur in the transmission regions T, whereby deterioration in display quality can be suppressed. On the other hand, in the liquid crystal display device 300 shown in FIG. 16, each side face 300a3 of level difference is not located in a reflection region R, and therefore leakage of transmitted light (light which is used for transmission-mode display) may occur, resulting in a noticeable deterioration in display quality.

Moreover, in the liquid crystal display device 300 shown in FIG. 16, each side face 300a3 of level difference is a region which is not covered by an electrode, and orientation restriction is realized by utilizing an oblique electric field generated in the side face 300a3, as shown in FIG. 17(a). However, since the side face 300a3 is tilted with respect to the substrate plane, orientation control may become difficult depending on the magnitude of the applied voltage, the tilting angle of the side face 300a3, and so on. For example, if the tilting angle of the side face 300a3 is large as shown in FIG. 17(b), the angle between the equipotential line EQ and each liquid crystal molecule 30a may become close to 90°, so that the orientation regulating force may become extremely weak.

In the liquid crystal display device 200, on the other hand, level differences are provided in the counter substrate 200b, so that the side faces 200b3 of level difference can be covered by the electrode 22. As shown in FIG. 18, on a side face 200b3 which is covered by the electrode 22, the equipotential line EQ is parallel to the side face 200b3 and orthogonal to the liquid crystal molecules 30a, and therefore orientation regulating force is not exhibited.

As described above, the liquid crystal display device 200 realizes a multi-gap structure with the level differences which are provided in the counter substrate 200b. Furthermore, since each side face 300b3 of level difference is located in a reflection region R and covered by the electrode 22, deterioration in display quality due to the tilt of the side faces 300b3 of level difference can be suppressed.

Next, other picture element electrodes to be used in the liquid crystal display device will be described. Although constructions in which unit solid portions 14a1 are arranged in a single row within each picture element region are illustrated in FIG. 1(a) and the like, the unit solid portions 14a1 may be arranged in a plurality of rows within each picture element region.

Figure 19:
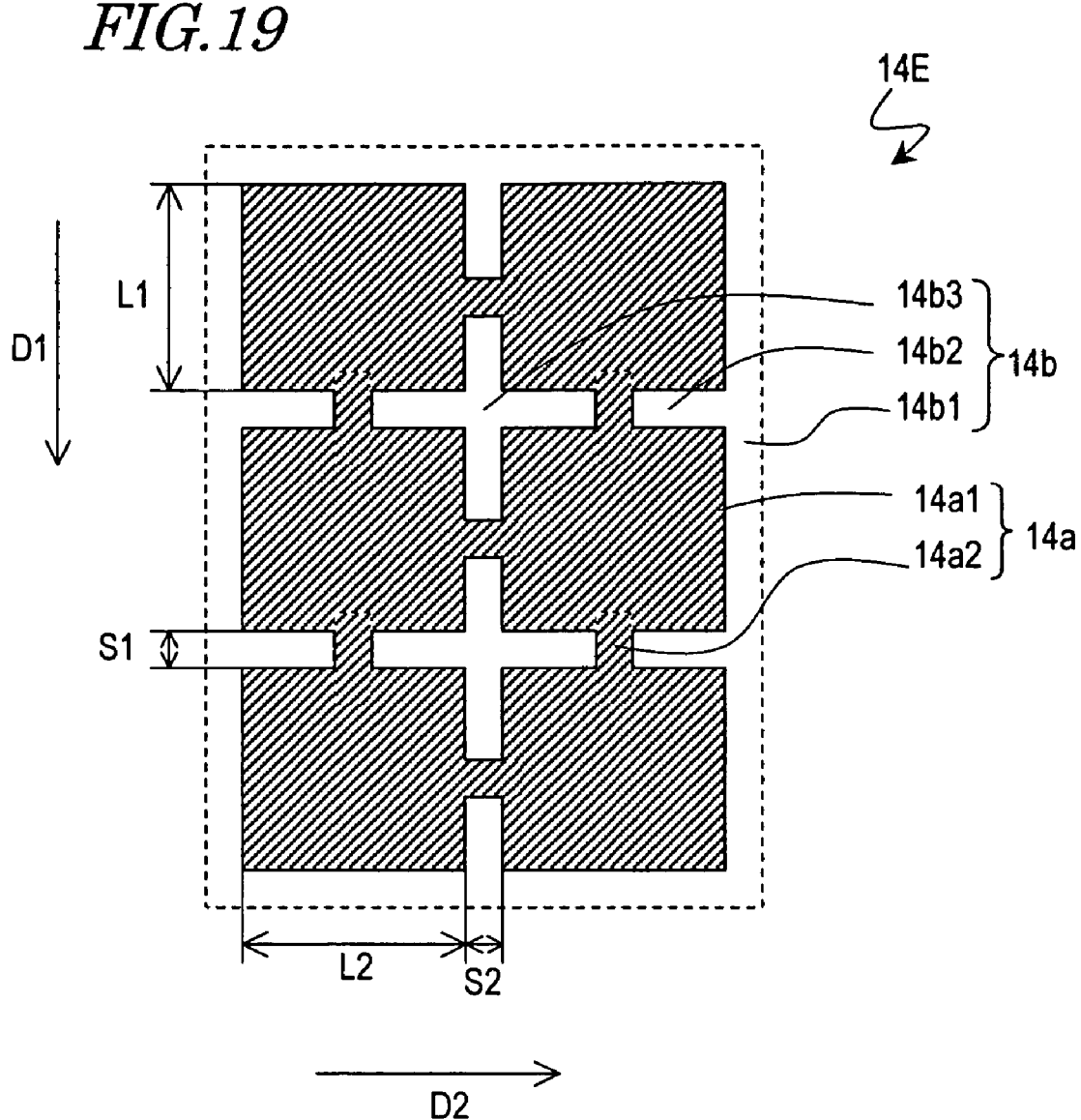
FIG. 19 is an upper plan view schematically showing another picture element electrode to be used in a liquid crystal display device.

FIG. 19 shows another example of a picture element electrode. A picture element electrode 14E shown in FIG. 19 has unit solid portions 14a1 which are arranged in two rows along a first direction D1 and a second direction D2 which is substantially orthogonal to the first direction.

The picture element electrode 14E includes connecting portions 14a2 which connect between adjoining unit solid portions 14a1 along the first direction D1, and connecting portions 14a2 which connect between adjoining unit solid portions 14a1 along the second direction D2. Therefore, it is preferable that the length L1 along the first direction D1 and the length L2 along the second direction D2 of each unit solid portion 14a1 both satisfy condition (1) above, and that the interval S1 along the first direction D1 and the interval S2 along the second directions D2 between unit solid portions 14a1 both satisfy condition (2).

Note that a non-solid portion 14b of the picture element electrode 14E includes openings 14b3 each surrounded by the solid portion 14a. Under an applied voltage, liquid crystal domains are formed not only in regions corresponding to the unit solid portions 14a1 but also in regions corresponding to the openings 14b3. This is illustrated in FIGS. 20(a) to (c). FIG. 20(a) shows absence of an applied voltage; FIG. 20(b) shows a state where the orientation has begun to change; and FIG. 20(c) shows a stationary state.

As shown in FIG. 20(a), in the absence of an applied voltage, the liquid crystal molecules 30a are oriented almost vertically with respect to the substrate plane. When a voltage is applied across the liquid crystal layer 30, as shown in FIG. 20(b), the liquid crystal molecules 30a near the edges of the non-solid portion 14b begin to be tilted under the influence of an oblique electric field, and the other liquid crystal molecules 30a are tilted so as to match the orientation of the tilted liquid crystal molecules 30a near the edges of the non-solid portion 14b. As a result, as shown in FIG. 20(c), liquid crystal domains are formed on each unit solid portion 14a1 and on each opening 14b3. The liquid crystal molecules 30a in a liquid crystal domain formed in a region corresponding to each opening 14b3 are in a radially-inclined orientation which is symmetric with respect to the center of the opening 14b3.

The radially-inclined orientation in the liquid crystal domain which is formed on each unit solid portion 14a1 and the radially-inclined orientation in the liquid crystal domain which is formed on each opening 14b1 are continuous with each other, and are both oriented so as to match the orientations of the liquid crystal molecules 30a at the edges EG of the non-solid portion 14b. The liquid crystal molecules 30a in the liquid crystal domain which is formed on each opening 14b3 are oriented in a conical shape which opens toward the upper side (counter substrate side), whereas the liquid crystal molecules 30a in the liquid crystal domain which is formed on each unit solid portion 14a1 are oriented in conical shape which opens toward the lower side (TFT substrate side).

Since the orientation of the liquid crystal domain which is formed on each unit solid portion 14a1 and the orientation of the liquid crystal domain which is formed on each opening 14b3 are continuous with each other, no disclination lines (disclination) are formed at boundaries therebetween. As a result, deterioration in display quality will not occur due to generation of disclination lines.

In order to realize good response characteristics (fast response speed), it is necessary to allow an oblique electric field for controlling the orientations of the liquid crystal molecules 30a to act on many liquid crystal molecules 30a, which requires a large number of non-solid portions 14b to be formed. Even if a large number of openings 14b3 are formed for improving the response characteristics, corresponding deterioration in display quality (occurrence of coarseness) can be suppressed when liquid crystal domains are formed corresponding to the openings 14b3.

Note that, when liquid crystal domains each taking a radially-inclined orientation are formed corresponding to the unit solid portions 14a1, orientation continuity of the liquid crystal molecules 30a within each picture element region can be attained even if the liquid crystal domain which is formed corresponding to each opening 14b3 does not take an exactly radially-inclined orientation, and therefore, the liquid crystal domain which is formed corresponding to each unit solid portion 14a1 has a stable radially-inclined orientation. Especially in the case where the area of each opening 14b3 is small, there is little contribution to display, so that deterioration in display quality will not be problematic even if a liquid crystal domain of a radially-inclined orientation is not formed in a region corresponding to each opening 14b3.

In the case where unit solid portions 14a1 are arranged in a plurality of rows, some of the connecting portions 14a2 may be omitted. Since no shift occurs in the center of orientation occurs in the portions where the connecting portions 14a2 are omitted, omitting some of the connecting portions 14a2 will result in a corresponding improvement in anti-pressure property.

Figure 21:
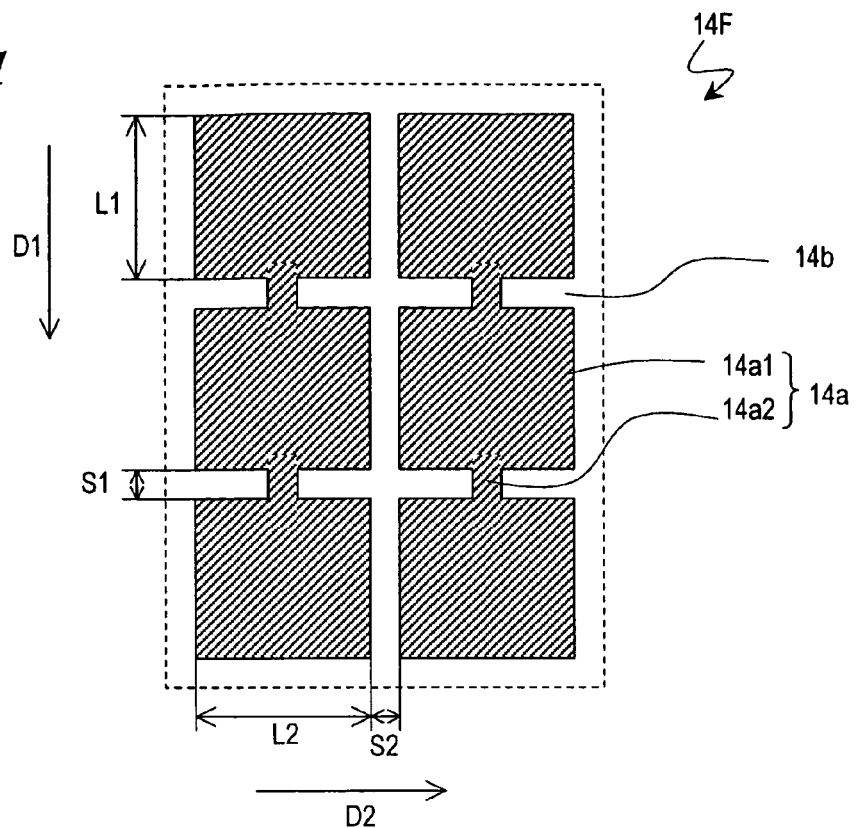
FIG. 21 is an upper plan view schematically showing still another picture element electrode to be used in the liquid crystal display device.
Figure 22:
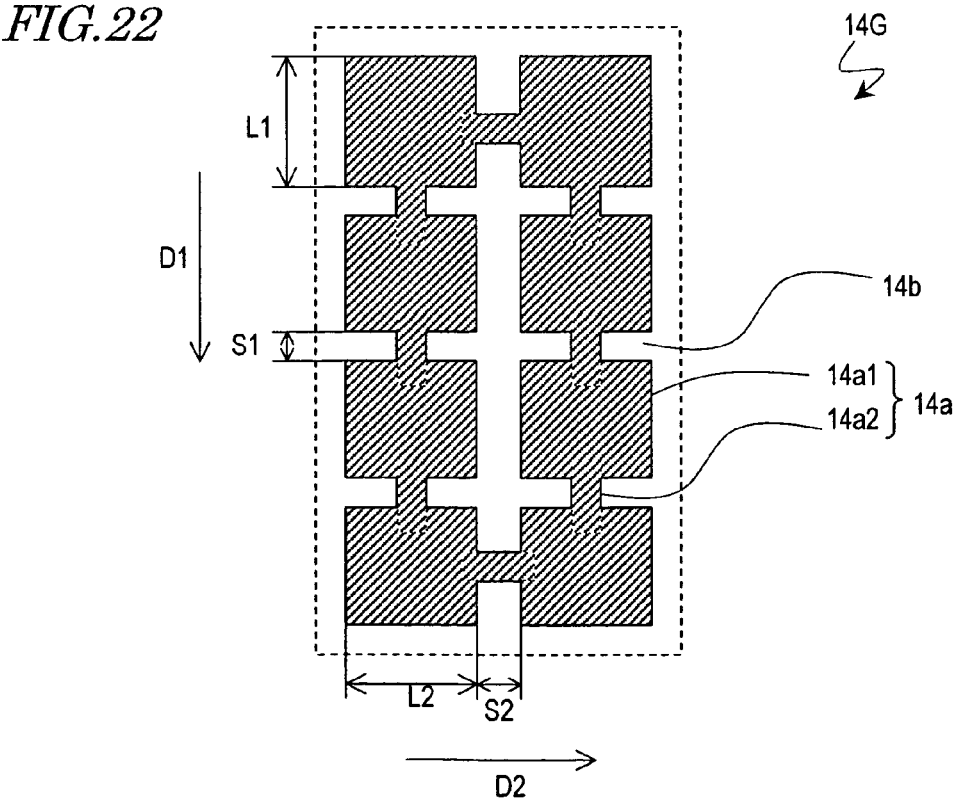
FIG. 22 is an upper plan view schematically showing still another picture element electrode to be used in the liquid crystal display device.

FIG. 21 and FIG. 22 show picture element electrodes 14F and 14G in which some of the connecting portions are omitted. In the picture element electrode 14F shown in FIG. 21, no connecting portions 14a2 are provided along the second direction D2. In the picture element electrode 14G shown in FIG. 22, some of the connecting portions 14a2 along the second direction D2 are omitted. When such picture element electrodes 14F and 14G are employed, deterioration in display quality due to press is unlikely to occur because no shift in the center of orientation occurs in the regions where connecting portions 14a2 are omitted.

Especially when all of the connecting portions 14a2 along the second direction D2 are omitted, as in the case of employing the picture element electrode 14F shown in FIG. 21, no shift in the center of orientation occurs along the second direction D2. Therefore, as to the second direction D2, it becomes unnecessary for the length L2 and interval S2 of the unit solid portions 14a1 to satisfy conditions (1) and (2), whereby the design freedom of the picture element electrode increases. However, in the case of employing the picture element electrode 14F shown in FIG. 21, the row of unit solid portions 14a1 on the right-hand side and the row of unit solid portions 14a1 on the left-hand side are not electrically connected via connecting portions; therefore, it must separately be ensured that they are electrically connected to TFTs.

INDUSTRIAL APPLICABILITY

According to the present technology, there is provided a CPA-type liquid crystal display device in which deterioration in display quality due to application of stress to a liquid crystal panel is suppressed.

A liquid crystal display device has excellent anti-pressure property and therefore can be suitably used for various electronic apparatuses, and can be especially suitably used in a mobile electronic apparatus electronic apparatus such as a PDA or a mobile phone, and in an electronic apparatus which does not have a protective plate on the viewer's side.

The invention claimed is:

1. A liquid crystal display device, comprising:
   a first substrate;
   a second substrate;
   a liquid crystal layer of a vertical-alignment type provided between the first substrate and the second substrate;
   a picture element region defined by a first electrode provided on a side of the first substrate facing the liquid crystal layer and a second electrode provided on an inner face of the second substrate facing the liquid crystal layer, the picture element region including a transmission region in which transmission-mode display is performed by using light entering through the first substrate and a reflection region in which reflection-mode display is performed using light entering through the second substrate, wherein the first electrode includes:
       a solid portion formed of an electrically-conductive film and a non-solid portion in which no electrically-conductive film is formed, the solid portion including a plurality of unit solid portions that extend in a first direction and that are substantially surrounded by the non-solid portion, the plurality of unit solid portions including at least one unit solid portion located in the transmission region, the plurality of unit solid portions being aligned in the first direction along an axis which is located essentially at a midpoint of opposing edges of the unit solid portions with respect to a second direction, the second direction being orthogonal to the first direction and wherein a length of the unit solid portion located in the transmission region, along the first direction, is 70 µm or less;

a connection portion connecting between two adjoining unit solid portions, the connecting portion being centered about the axis with respect to the second direction and indented in the second direction toward the axis with respect to the opposing edges of the at least one unit solid portion, and wherein an interval of the plurality of the unit solid portions and thus a length of the connection portion along the first direction is 8.0 µm or more; and wherein the inner face of the second substrate has an upper level face located in the reflection region and a lower level face located in the transmission region such that a thickness of the liquid crystal layer in the reflection region is smaller than a thickness of the liquid crystal layer in the transmission region and wherein a side face of the second substrate joins the upper level face and the lower level face, wherein the side face is located in the reflection region, and wherein the side face is covered with the second electrode.

2. The liquid crystal display device of claim 1, wherein the interval of the plurality of the unit solid portions along the first direction is 8.5 µm or more.

3. The liquid crystal display device of claim 1, wherein the second substrate includes a protrusion provided in a region corresponding to a vicinity of a center of a liquid crystal domain formed in the transmission region, and wherein a ratio H/D of a height H of the protrusion to a thickness D of the liquid crystal layer in the transmission region is 0.42 or more.

4. The liquid crystal display device of claim 1, wherein the unit solid portions are arranged in at least two columns, wherein the unit solid portions extend in the first direction along each column, and wherein the unit solid portions extend along a second direction that is perpendicular to the first direction to form multiple columns, and wherein the connecting portion only connects the unit solid portions which adjoin each other along the first direction.

5. The liquid crystal display device of claim 1, wherein when a voltage is applied between the first electrode and the second electrode, with an oblique electric field generated at an edge of the non-solid portion, the liquid crystal layer forms a liquid crystal domain on each of the unit solid portions, the liquid crystal domain taking a radially-inclined orientation, and wherein an orientation of the liquid crystal domain and an orientation of a region of the liquid crystal layer corresponding to the non-solid portion of the first electrode are substantially continuous with each other.

6. The liquid crystal display device of claim 1, wherein each of the plurality of the unit solid portions is of a shape having rotational symmetry.

7. The liquid crystal display device of claim 6, wherein each of the plurality of the unit solid portions is of a generally rectangular shape.

8. The liquid crystal display device of claim 6, wherein each of the plurality of the unit solid portions is of a generally rectangular shape having generally arc-shaped corners, and wherein the arc-shaped corners of each of the unit solid portions have a radius of curvature located inside the unit solid portions.

9. An electronic apparatus comprising the liquid crystal display device of claim 1.

10. The electronic apparatus of claim 9, which is a mobile electronic apparatus.

11. The electronic apparatus of claim 9 not comprising a protective plate on a viewer's side of the second substrate.

12. A liquid crystal display device, comprising:
a first substrate;
a second substrate;
a liquid crystal layer of a vertical-alignment type provided between the first substrate and the second substrate;
a picture element region defined by a first electrode provided on a side of the first substrate facing the liquid crystal layer and a second electrode provided on an inner face of the second substrate facing the liquid crystal layer, the picture element region including a transmission region in which transmission-mode display is performed by using light entering through the first substrate and a reflection region in which reflection-mode display is performed using light entering through the second substrate, wherein the first electrode includes:
  a solid portion formed of an electrically-conductive film and a non-solid portion in which no electrically-conductive film is formed, the solid portion including a plurality of unit solid portions that extend in a first direction and that are substantially surrounded by the non-solid portion, the plurality of unit solid portions including at least one unit solid portion located in the transmission region;
  a connection portion connecting between two adjoining unit solid portions;
wherein the inner face of the second substrate has an upper level face located in the reflection region and a lower level face located in the transmission region such that a thickness of the liquid crystal layer in the reflection region is smaller than a thickness of the liquid crystal layer in the transmission region and wherein a side face of the second substrate joins the upper level face and the lower level face, wherein the side face is located in the reflection region, and wherein the side face is covered with the second electrode;
wherein a length of the unit solid portion located in the transmission region and an interval of the plurality of the unit solid portions along the first direction are chosen so after application of stress to the molecules of the liquid crystal layer a center of orientation of a radially inclined orientation of the molecules returns from the at least one connection portion to near a center of the at least one unit solid portion.

13. The liquid crystal display device of claim 1, wherein a length of the unit solid portion located in the transmission region, along the first direction, is 70 µm or less and wherein the interval of the plurality of the unit solid portions along the first direction is 8.0 µm or more.

* * * * *